(12) United States Patent
Merriman et al.

(10) Patent No.: US 9,306,199 B2
(45) Date of Patent: Apr. 5, 2016

(54) BATTERY MODULE AND METHOD FOR ASSEMBLING THE BATTERY MODULE

(75) Inventors: Robert Merriman, Shelby Township, MI (US); Anthony Arena, Macomb, MI (US); David Beltz, Troy, MI (US); Greg Phillips, White Lake, MI (US); Michael Garascia, Waterford, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 885 days.

(21) Appl. No.: 13/587,030

(22) Filed: Aug. 16, 2012

(65) Prior Publication Data

US 2014/0050966 A1   Feb. 20, 2014

(51) Int. Cl.
  *H01M 10/04*   (2006.01)
  *H01M 2/10*   (2006.01)
  *H01M 10/0525*   (2010.01)
  *H01M 10/6557*   (2014.01)
  *H01M 10/6566*   (2014.01)

(52) U.S. Cl.
  CPC .......... *H01M 2/1061* (2013.01); *H01M 2/1016* (2013.01); *H01M 2/1077* (2013.01); *H01M 10/0468* (2013.01); *H01M 10/0481* (2013.01); *H01M 10/0525* (2013.01); *H01M 10/6557* (2015.04); *H01M 10/6566* (2015.04); *Y02E 60/122* (2013.01); *Y10T 29/49108* (2015.01)

(58) Field of Classification Search
  CPC .................. H01M 10/0468; H01M 2/1016
  USPC ....................................................... 429/163
  See application file for complete search history.

(56) References Cited

U.S. PATENT DOCUMENTS

| | | | |
|---|---|---|---|
| 1,587,425 | A | 6/1926 | Otto |
| 2,273,244 | A | 2/1942 | Cornelius |
| 2,391,859 | A | 1/1946 | Earl |
| 3,503,558 | A | 3/1970 | Galiulo et al. |
| 3,522,100 | A | 7/1970 | Lindstrom |

(Continued)

FOREIGN PATENT DOCUMENTS

| | | |
|---|---|---|
| CN | 1385917 A | 12/2002 |
| CN | 101101997 A | 1/2008 |

(Continued)

OTHER PUBLICATIONS

Mavrigian, HPBooks High Performance Fasteners & Plumbing, Jan. 2008, Penguin Group, First Edition, pp. 13-14.*

(Continued)

*Primary Examiner* — Jonathan G Leong
(74) *Attorney, Agent, or Firm* — Buckert Patent & Trademark Law Firm, PC; John F. Buckert

(57) ABSTRACT

A battery module and a method for assembling the battery module are provided. The battery module includes a first end plate, a second end plate, a frame member, a first battery cell disposed between the first end plate and the frame member, and a second battery cell disposed between the second end plate and the frame member. The battery module further includes a first shoulder bolt having a first head portion, a first shaft portion, a first shoulder portion, and a first threaded portion. The first shoulder bolt is disposed such that the first head portion is disposed against the first end plate and the first shaft portion extends through a first aperture of the first end plate and a first aperture of the frame member, and the first shoulder portion is disposed against the second end plate.

15 Claims, 26 Drawing Sheets

(56) References Cited

U.S. PATENT DOCUMENTS

| | | |
|---|---|---|
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,159,630 A | 12/2000 | Wyser |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Horstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,124 B2 | 11/2006 | Garthwaite |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0012833 A1 | 1/2002 | Gow et al. |
| 2002/0086201 A1 | 7/2002 | Payen et al. |
| 2002/0182493 A1 | 12/2002 | Ovshinsky et al. |
| 2003/0017384 A1 | 1/2003 | Marukawa et al. |
| 2003/0080714 A1 | 5/2003 | Inoue et al. |
| 2003/0189104 A1 | 10/2003 | Watanabe et al. |
| 2003/0211384 A1 | 11/2003 | Hamada et al. |
| 2004/0069474 A1 | 4/2004 | Wu et al. |
| 2004/0121205 A1 | 6/2004 | Blanchet |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0110606 A1 | 5/2008 | Gorbounov et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0123819 A1 | 5/2009 | Kim |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2009/0325059 A1 | 12/2009 | Niedzwiecki et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0052960 A1 | 3/2011 | Kwon et al. |
| 2011/0189523 A1 | 8/2011 | Eom |
| 2011/0293982 A1 | 12/2011 | Martz et al. |
| 2011/0293983 A1 | 12/2011 | Oury et al. |
| 2012/0082880 A1 | 4/2012 | Koetting et al. |
| 2012/0156537 A1* | 6/2012 | Meintschel et al. ........... 429/99 |
| 2012/0156542 A1 | 6/2012 | Schaefer et al. |
| 2012/0171543 A1 | 7/2012 | Hirsch et al. |
| 2012/0183830 A1 | 7/2012 | Schaefer et al. |
| 2013/0045410 A1 | 2/2013 | Yang et al. |
| 2013/0136136 A1 | 5/2013 | Ando et al. |
| 2013/0255293 A1 | 10/2013 | Gadawski et al. |
| 2013/0309542 A1 | 11/2013 | Merriman et al. |
| 2014/0050953 A1 | 2/2014 | Yoon et al. |

(56) References Cited

U.S. PATENT DOCUMENTS

| | | |
|---|---|---|
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |
| 2014/0308558 A1 | 10/2014 | Merriman et al. |
| 2015/0010801 A1 | 1/2015 | Arena et al. |
| 2015/0111075 A1 | 4/2015 | Yum et al. |

FOREIGN PATENT DOCUMENTS

| | | |
|---|---|---|
| CN | 1754279 B | 9/2010 |
| DE | 19639115 A | 3/1998 |
| DE | 102008034860 A1 | 1/2010 |
| DE | 102009006426 A1 | 7/2010 |
| DE | 102010021922 A1 | 12/2011 |
| EP | 1577966 A | 9/2005 |
| EP | 1852925 A | 11/2007 |
| EP | 2065963 A2 | 6/2009 |
| EP | 2200109 A2 | 6/2010 |
| EP | 2262048 A | 12/2010 |
| GB | 481891 A | 3/1938 |
| JP | 08111244 | 4/1996 |
| JP | 09129213 | 5/1997 |
| JP | 19970199186 | 7/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006512731 | 4/2006 |
| JP | 2006125835 | 5/2006 |
| JP | 2006139928 A | 6/2006 |
| JP | 2007107684 | 4/2007 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 1020100119497 A | 11/2010 |
| KR | 1020100119498 A | 11/2010 |
| KR | 1020110013270 A | 2/2011 |
| KR | 20110126764 A | 11/2011 |
| WO | 2006083446 A2 | 8/2006 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |
| WO | WO 2010081704 A2 * | 7/2010 |
| WO | 2011145830 A2 | 11/2011 |

OTHER PUBLICATIONS

"Gasket". Merriam-Webster. Merriam-Webster. Web. May 30, 2012. <http://www.merriam-webster.com/dictionary/gasket>.
International Search Report; International Application No. PCT/KR2009/000258; International Filing Date: Jan. 16, 2009; Date of Mailing: Aug. 28, 2009; 2 pages.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003434; International Filing Date: Jun. 25, 2009; Date of Mailing: Jan. 18, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.
Machine translation of Japanese Patent Application No. 2009-009889 A, published Jan. 15, 2009.
Thomas J. Gadawski et al., pending U.S. Appl. No. 13/433,649 entitled "Battery System and Method for Cooling the Battery System," filed Mar. 29, 2012.
U.S. Appl. No. 13/475,963, filed May 19, 2012 entitled Battery Cell Assembly and Method for Manufacturing a Cooling Fin for the Battery Cell Assembly.
U.S. Appl. No. 13/586,960, filed Aug. 16, 2012 entitled Battery Module.
International Search Report for International application No. PCT/KR2013/004015 dated Sep. 26, 2013.
U.S. Appl. No. 14/161,806, filed Jan. 23, 2014 entitled Battery Cell Assembly and Method for Coupling a Cooling Fin to First and Second Cooling Manifolds.
U.S. Appl. No. 14/273,572, filed May 9, 2014 entitled Battery Pack and Method of Assembling the Battery Pack.
U.S. Appl. No. 14/273,586, filed May 9, 2014 entitled Battery Module and Method of Assembling the Battery Module.
U.S. Appl. No. 14/328,000, filed Jul. 10, 2014 entitled Battery System and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
U.S. Appl. No. 14/516,667, filed Oct. 17, 2014 entitled Battery Cell Assembly.
U.S. Appl. No. 14/531,696, filed Nov. 3, 2014 entitled Battery Pack.
Written Opinion for International application No. PCT/KR2013002597 dated Feb. 2, 2015.
Written Opinion for International application No. PCT/KR2014/002090 dated May 26, 2014.

* cited by examiner

BATTERY MODULE AND METHOD FOR ASSEMBLING THE BATTERY MODULE

BACKGROUND

The inventors herein have recognized a need for an improved battery module and a method for assembling the battery module.

SUMMARY

A battery module in accordance with an exemplary embodiment is provided. The battery module includes a first end plate having first, second, third and fourth apertures extending therethrough. The battery module further includes a frame member having first, second, third, and fourth apertures extending therethrough. The battery module further includes a first battery cell disposed between the first end plate and the frame member. The battery module further includes a second end plate having first, second, third and fourth apertures extending therethrough. The battery module further includes a second battery cell disposed between the second end plate and the frame member. The battery module further includes a first shoulder bolt having a first head portion, a first shaft portion, a first shoulder portion, and a first threaded portion. The first shaft portion has a first end and a second end. The first end of the first shaft portion extends from the first head portion. The first shoulder portion is disposed at the second end of the first shaft portion. The first threaded portion extends from the second end of the first shaft portion. The first shoulder bolt is disposed such that the first head portion is disposed against the first end plate and the first shaft portion extends through the first aperture of the first end plate and the first aperture of the frame member, and the first shoulder portion is disposed against the second end plate and the first threaded portion extends through the first aperture of the second end plate and is threadably received in a first nut disposed against the second end plate.

A method of assembling a battery module in accordance with another exemplary embodiment is provided. The method includes providing a first end plate having first, second, third and fourth apertures extending therethrough. The method further includes providing a frame member having first, second, third, and fourth apertures extending therethrough. The method further includes providing first and second battery cells. The method further includes providing a second end plate having first, second, third and fourth apertures extending therethrough. The method further includes providing a first shoulder bolt having a first head portion, a first shaft portion, a first shoulder portion, and a first threaded portion. The first shaft portion has a first end and a second end. The first end of the first shaft portion extends from the first head portion. The first shoulder portion is disposed at the second end of the first shaft portion. The first threaded portion extends from the second end of the first shaft portion. The method further includes disposing the first battery cell between the first end plate and the frame member. The method further includes disposing the second battery cell between the second end plate and the frame member. The method further includes positioning the first shoulder bolt such that the first head portion is disposed against the first end plate and the first shaft portion extends through the first aperture of the first end plate and the first aperture of the frame member, and the first shoulder portion is disposed against the second end plate and the first threaded portion extends through the first aperture of the second end plate and is threadably received in a first nut disposed against the second end plate.

DETAILED DESCRIPTION

Figure 1:
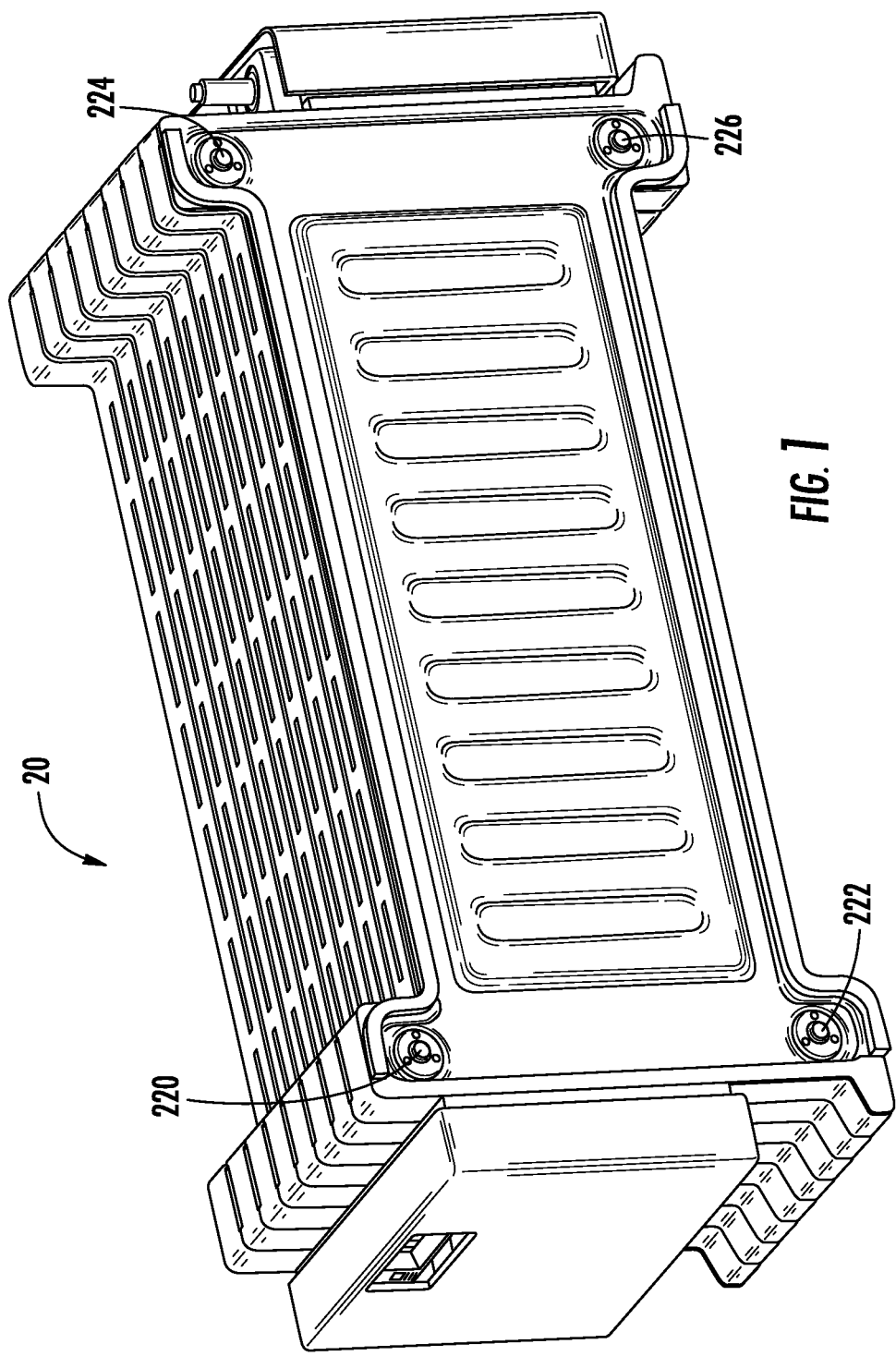
FIG. 1 is a schematic of a battery module in accordance with an exemplary embodiment.

Referring to FIGS. 1-4, a battery system 10 having a battery module 20, an air cooling system 30, and conduits 40, 42 is illustrated. The air cooling system 30 moves air through the conduit 40 and the battery module 20 and then through the conduit 42 for cooling battery cells within the battery module 20.

Referring to FIGS. 3-10, the battery module 20 includes end plates 100, 102, battery cells 120, 122, 124, 126, 128, 130, 132, 134, 136, 138, 140, 142, 144, 146, 148, 150, frame members 180, 182, 184, 186, 188, 190, 192, 194, first, second, third, and fourth shoulder bolts 220, 222, 224, 226, nuts 240, 242, 244, 246, and manifolds 260, 262.

Figure 7:
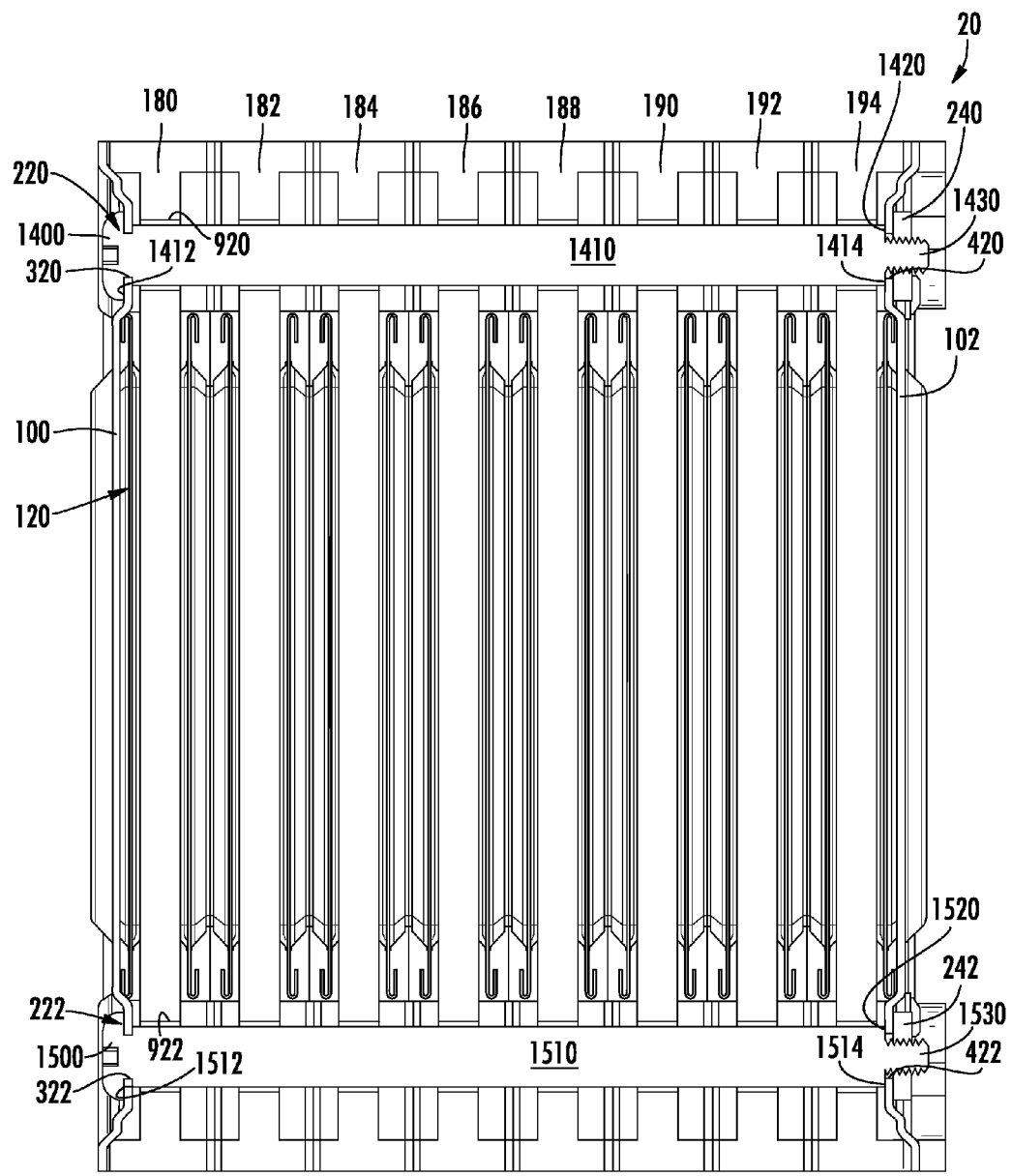
FIG. 7 is a cross-sectional schematic of the battery module of FIG. 1.
Figure 8:
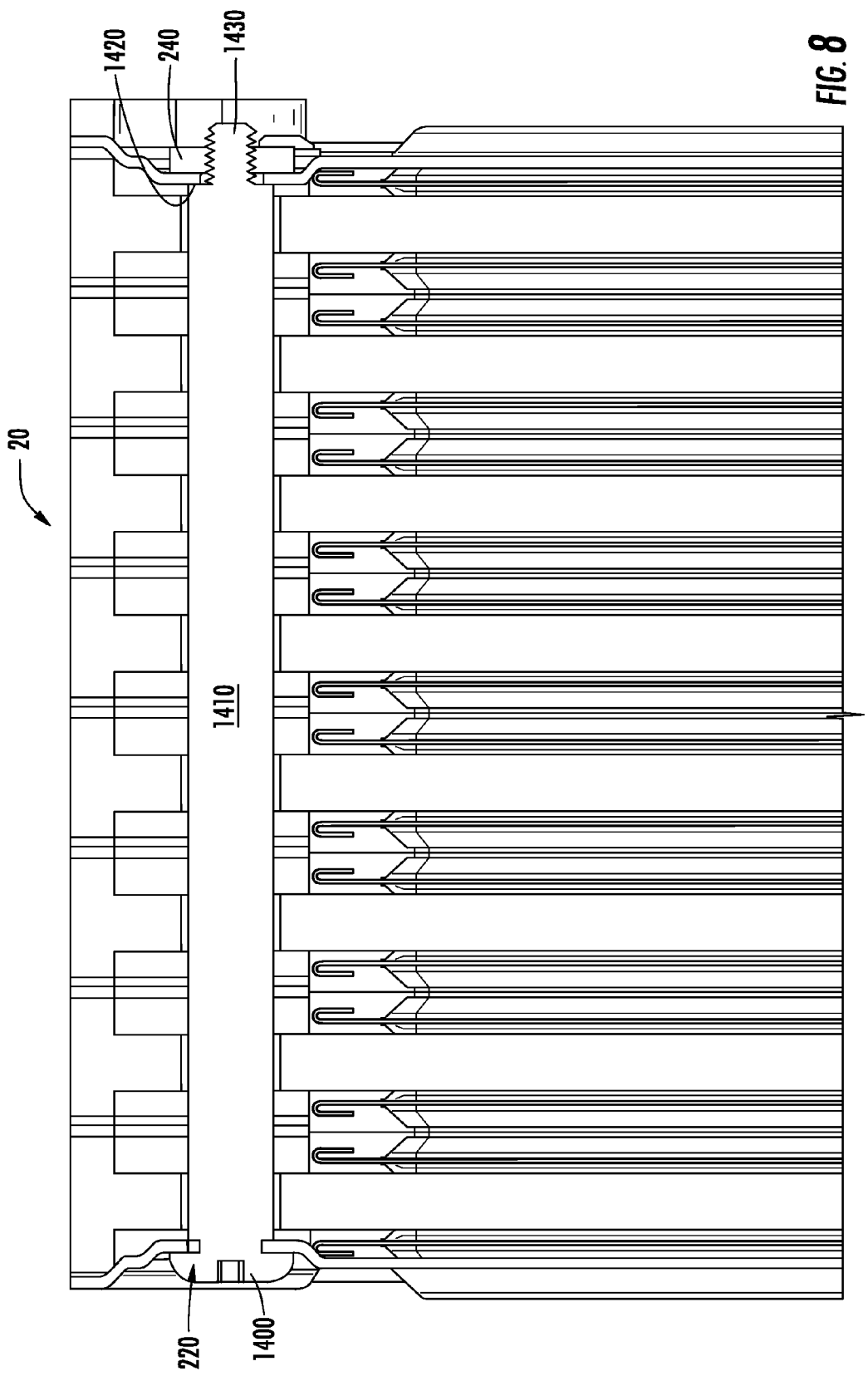
FIG. 8 is an enlarged cross-sectional schematic of a portion of the battery module of FIG. 1.
Figure 9:
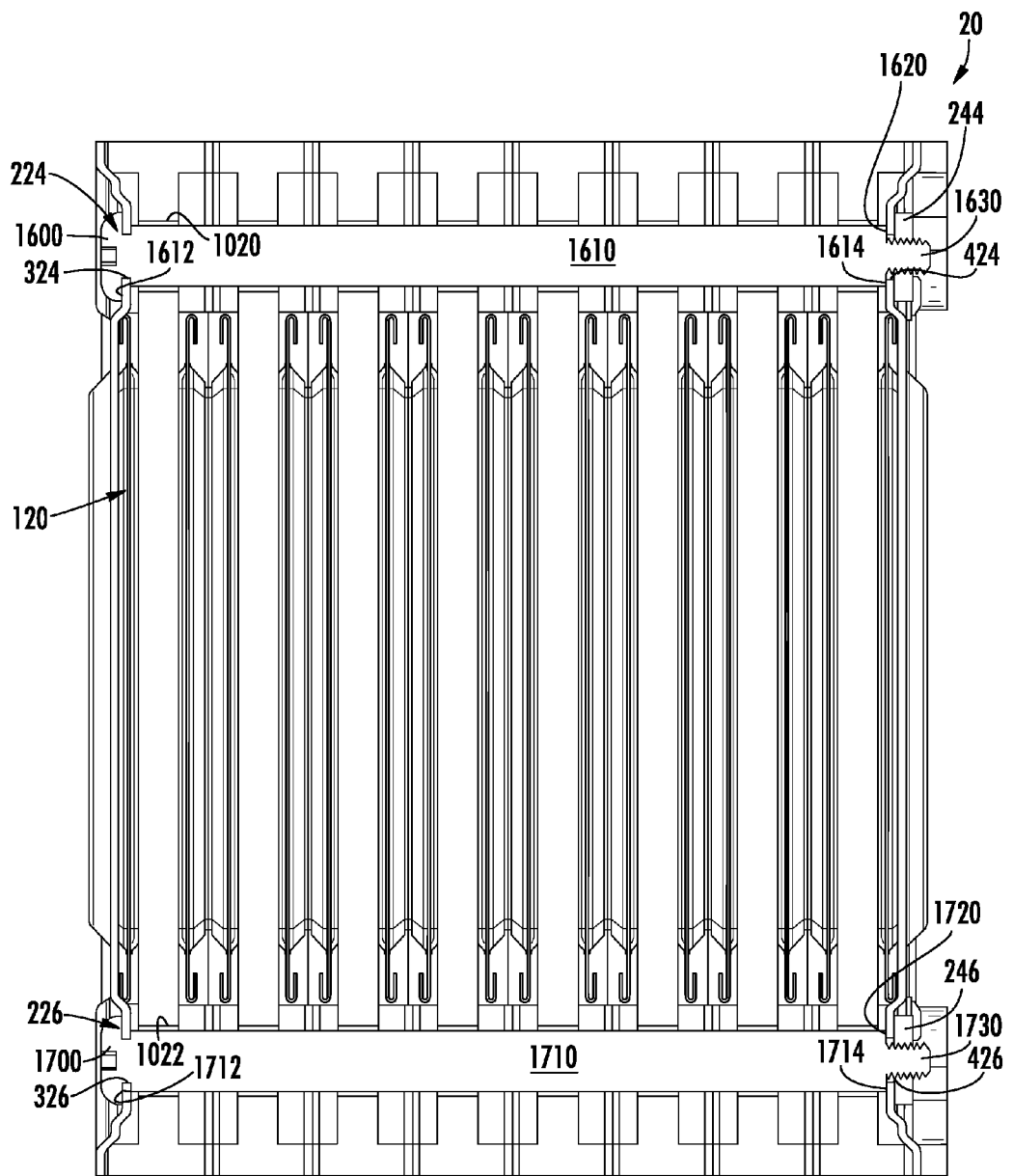
FIG. 9 is another cross-sectional schematic of the battery module of FIG. 1.
Figure 10:
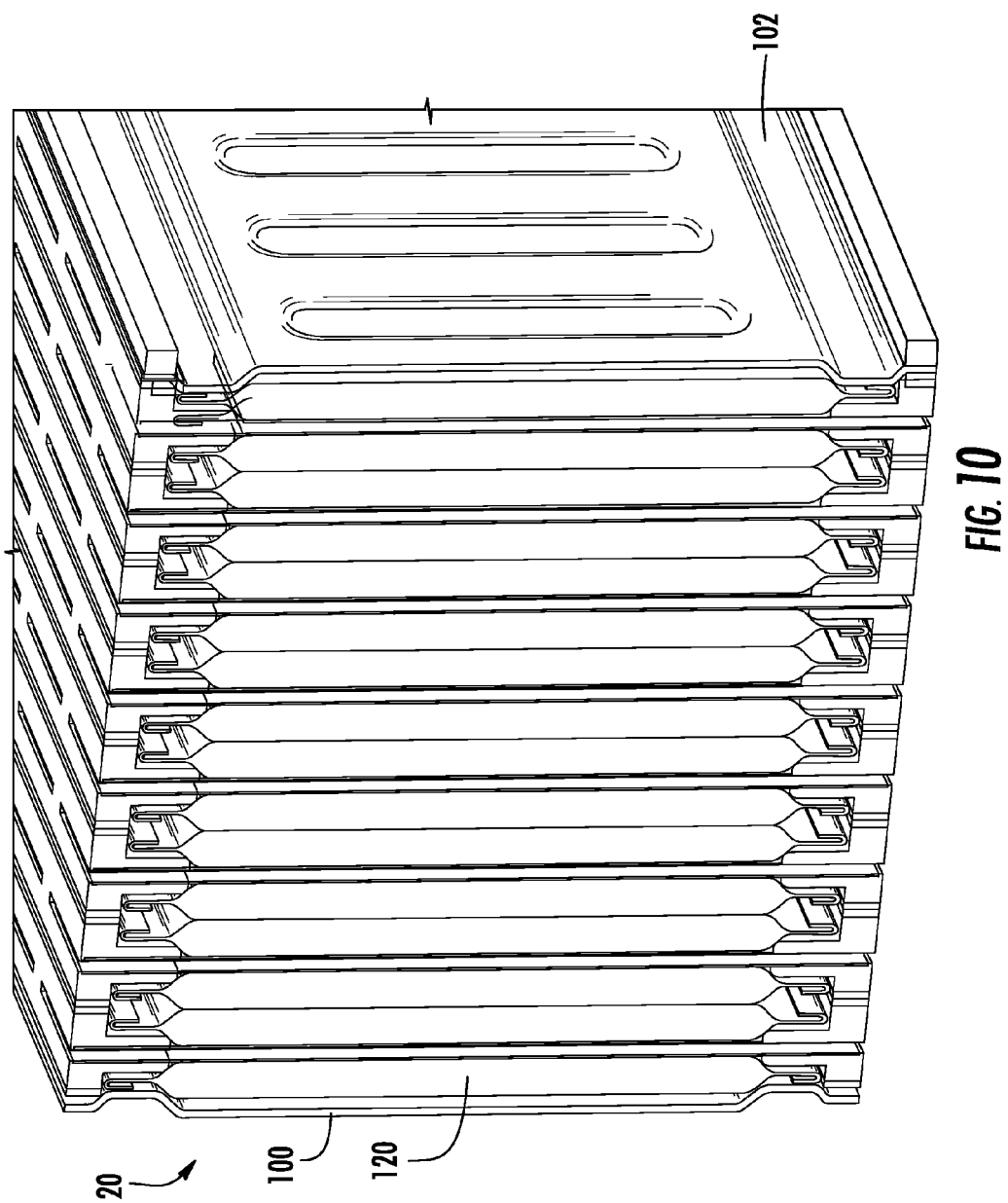
FIG. 10 is another cross-sectional schematic of the battery module of FIG. 1.
Figure 11:
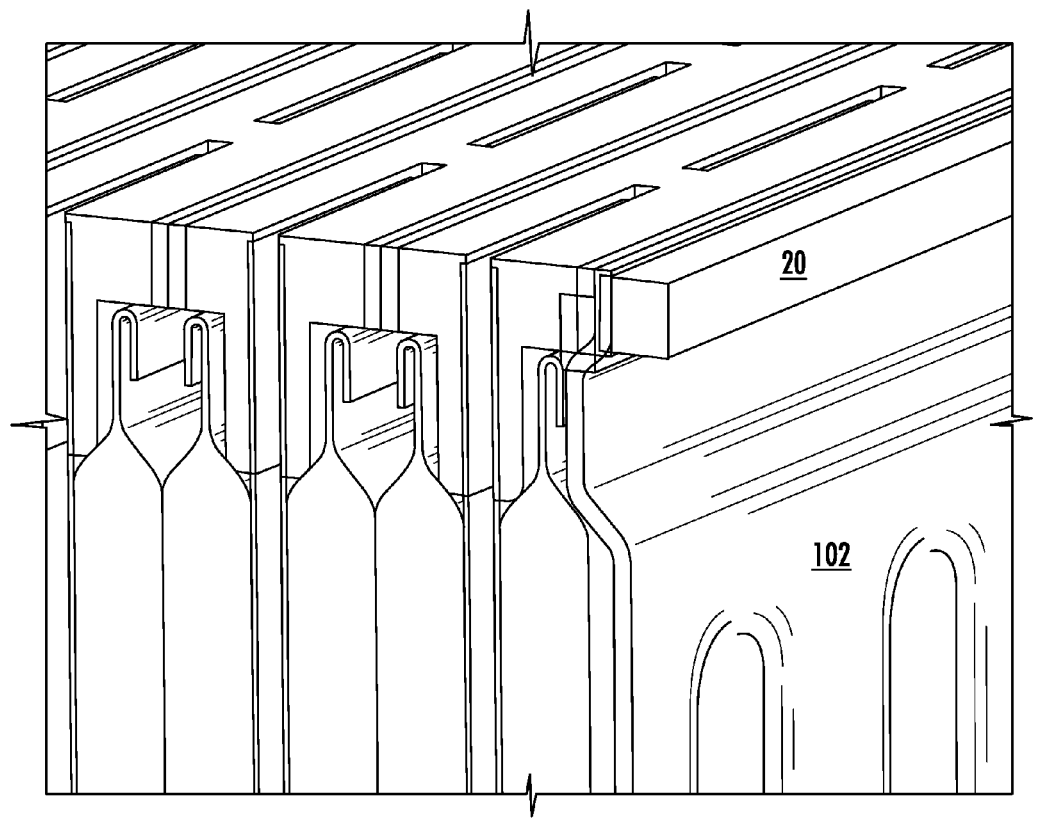
FIG. 11 is an enlarged cross-sectional schematic of a portion of the battery module of FIG. 1.
Figure 12:
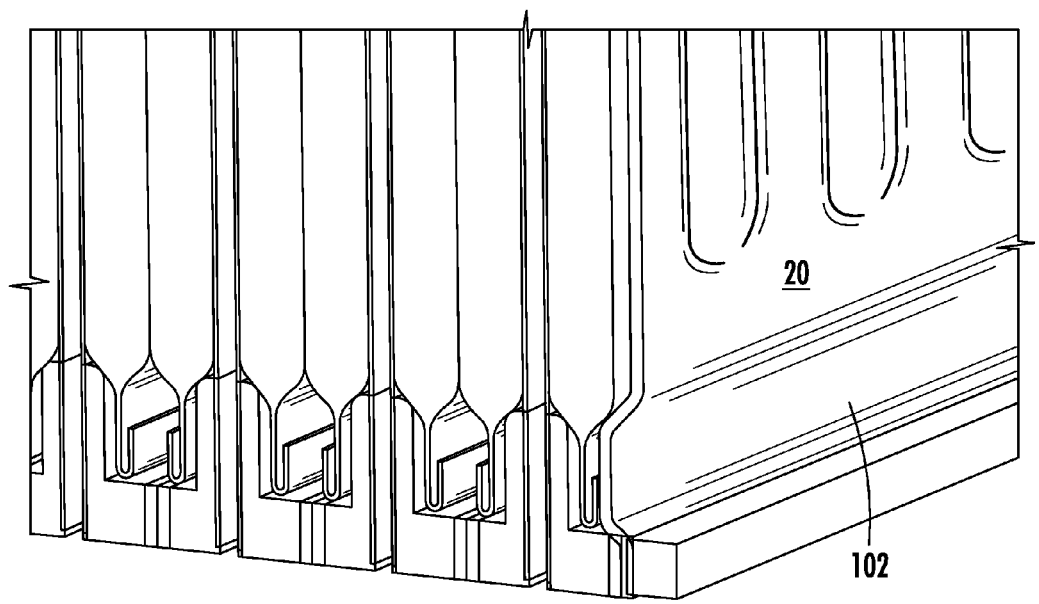
FIG. 12 is another enlarged cross-sectional schematic of a portion of the battery module of FIG. 1.
Figure 13:
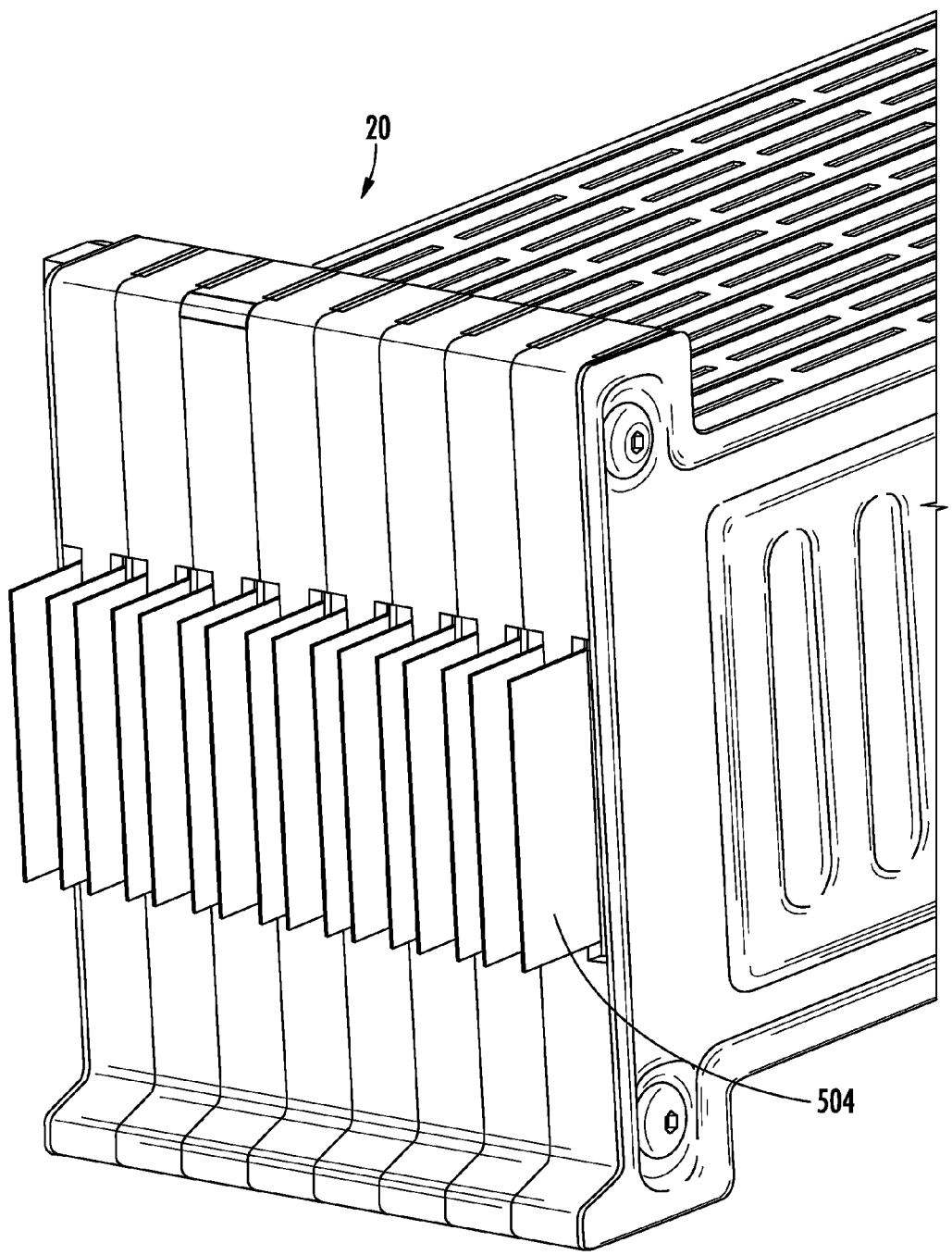
FIG. 13 is a schematic of a portion of the battery module of FIG. 1 illustrating electrical terminals extending therefrom.

Referring to FIGS. 7 and 9, the end plates 100, 102 are provided to hold the remaining components of the battery module 20 therebetween. In one exemplary embodiment, the end plates 100, 102 are constructed of steel. The end plate 100 includes apertures 320, 322, 324, 326 extending therethrough for receiving portions of shoulder bolts therethrough. The end plate 102 includes apertures 420, 422, 424, 426 extending therethrough for receiving portions of shoulder bolts therethrough.

Referring to FIGS. 7, 13, 25 and 26, the battery cells 120-150 have a substantially similar structure. Thus, only the structure of the battery cell 120 will be described in greater detail below. In one exemplary embodiment, the battery cells 120-150 are electrically coupled in series to one another. Further, in one exemplary embodiment, the battery cells 120-150 are lithium-ion battery cells. Of course, in alternative embodiments, the battery cells 120-150 could be other types of battery cells known to those skilled in the art. The battery cell 120 includes a body portion 502 and electrical terminals 504, 506 extending from opposite ends of the body portion 502.

Referring to FIGS. 4-6 and 14, the frame members 180-194 are provided to hold the battery cells therebetween and to allow air to flow through the frame members 180-194 to cool the battery cells.

The frame member 180 is disposed between the end plate 100 and the frame member 182. The battery cell 120 is disposed between the frame member 180 and the end plate 100. Also, the battery cells 122, 124 are disposed between the frame members 180, 182 and the body portions of the battery cells 122, 124 are surrounded by the frame members 180, 182.

The frame member 182 is disposed between the frame member 180 and the frame member 184. The battery cells 126, 128 are disposed between the frame members 182, 184 and the body portions of the battery cells 126, 128 are surrounded by the frame members 182, 184.

The frame member 184 is disposed between the frame member 182 and the frame member 186. The battery cells 130, 132 are disposed between the frame members 184, 186 and the body portions of the battery cells 130, 132 are surrounded by the frame members 184, 186.

The frame member 186 is disposed between the frame member 184 and the frame member 188. The battery cells 134, 136 are disposed between the frame members 186, 188 and the body portions of the battery cells 134, 136 are surrounded by the frame members 186, 188.

The frame member 188 is disposed between the frame member 186 and the frame member 190. The battery cells 138, 140 are disposed between the frame members 188, 190 and the body portions of the battery cells 138, 140 are surrounded by the frame members 188, 190.

The frame member 190 is disposed between the frame member 188 and the frame member 192. The battery cells 142, 144 are disposed between the frame members 190, 192 and the body portions of the battery cells 142, 144 are surrounded by the frame members 190, 192.

The frame member 192 is disposed between the frame member 190 and the frame member 194. The battery cells 146, 148 are disposed between the frame members 192, 194 and the body portions of the battery cells 146, 148 are surrounded by the frame members 192, 194.

The frame member 194 is disposed between the frame member 192 and the end plate 102. The battery cell 150 is disposed between the frame member 194 and the end plate 102 and the body portion of the battery cell 150 is surrounded by the frame member 194 and the end plate 102.

The frame members 180-194 have an identical structure and only the structure of the frame member 180 will be described in greater detail below. Referring to FIGS. 5, 6 and 14-17, the frame member 180 includes first and second sides 600, 605, first, second, third, and fourth peripheral walls 610, 620, 630, 640, first and second thermally conductive plates 650, 660, and first and second elastomeric sealing members 670, 680. In one exemplary embodiment, the first, second, third and fourth peripheral walls 610, 620, 630, 640 define a substantially rectangular ring-shaped frame and are centered symmetrically about a plane 641 extending through the walls 610, 620, 630, 640. The first and second peripheral walls 610, 620 are substantially parallel to one another and are disposed between and coupled to the third and fourth peripheral walls 630, 640. The third and fourth peripheral wall 630, 640 are substantially parallel to one another and are substantially perpendicular to the first and second peripheral walls 610, 620. The first, second, third and fourth peripheral walls 610, 620, 630, 640 define an open interior region 642 (shown in FIG. 16) therebetween. In one exemplary embodiment, the first, second, third, and fourth peripheral walls 610, 620, 630, 640 are constructed of plastic.

The first peripheral wall 610 includes a plurality of apertures 710 extending therethrough. The plurality of apertures 710 include apertures 712, 714, 716, 718, 720, 722, 724. The plurality of apertures 710 are configured to receive air flowing therethrough for cooling battery cells.

The second peripheral wall 620 includes a plurality of apertures 810 extending therethrough. The plurality of apertures 810 include apertures 812, 814, 816, 818, 820, 822, 824. The plurality of apertures 810 are configured to receive air flowing therethrough for cooling battery cells.

The third peripheral wall 630 includes an outlet 830 (e.g., a groove) extending into the first side 600, and an outlet 832 (e.g., a groove) extending into the second side 605. Alternatively, the outlets 830, 832, could be apertures extending through the third peripheral wall 630. The outlets 830, 832 are configured to receive an electrical terminal 504 and another electrical terminal, respectively, of the battery cells 120, 122 therethrough. Further, the outlets 830, 832 are configured to route any gases from the battery cells 120, 122 past the associated electrical terminals to outside of the frame member 180 if the battery cells 120, 122 output gases therefrom. The third peripheral wall 630 further includes peripheral corner regions 840, 842 having apertures 920, 922 respectively, extending therethrough. The apertures 920, 922 are configured to receive portions of the shoulder bolts 220, 222, respectively, therethrough.

The fourth peripheral wall 640 includes an outlet 1030 (e.g., a groove) extending into the first side 600, and an outlet 1032 (e.g., a groove) extending into the second side 605. Alternatively, the outlets 1030, 1032, could be apertures extending through the fourth peripheral wall 640. The outlets 1030, 1032 are configured to receive an electrical terminal 506 and another electrical terminal, respectively, of the battery cells 120, 122 therethrough. Further, the outlets 1030, 1032 are configured to route any gases from the battery cells 120, 122 past the associated electrical terminals to outside of the frame member 180 if the battery cells 120, 122 output gases therefrom. The fourth peripheral wall 640 further includes peripheral corner regions 1040, 1042 having apertures 1020, 1022 respectively, extending therethrough. The apertures 1020, 1022 are configured to receive portions of the shoulder bolts 224, 226, respectively, therethrough.

Referring to FIGS. 4 and 18-21, the first and second thermally conductive plates 650, 660 are configured to conduct heat energy away from adjacent battery cells into air flowing between the plates 650, 660. In one exemplary embodiment, the first and second thermally conductive plates 650, 660 are constructed of steel and have corrugated cross-sectional profiles which define a plurality of flow channels therebetween. Of course, in alternative embodiments, other thermally conductive materials known to those skilled in the art could be utilized to construct the plates 650, 660. The first and second thermally conductive plates 650, 660 are fixedly coupled together via weld joints. In one exemplary embodiment, the first, second, third, and fourth peripheral walls 610, 620, 630, 640 are injected-molded around portions of the first and second thermally conductive plates 650, 660.

The first thermally conductive plate 650 is coupled to the first, second, third and fourth peripheral walls 610, 620, 630, 640 to enclose the open interior region 642 proximate to the first side 600 of the frame member 180. The first thermally conductive plate 650 is disposed against the battery cell 120. An area of a side of the first thermally conductive plate 650 is substantially equal to an area of a side of a body portion of the battery cell 120 adjacent to the first thermally conductive plate 650. The first thermally conductive plate 650 includes tread portions 1050, 1052, 1054, 1056, 1058, 1060, 1062, 1064 and ridge portions 1070, 1072, 1074, 1076, 1078, 1080, 1082, 1084.

The second thermally conductive plate 660 is coupled to the first, second, third and fourth peripheral walls 610, 620, 630, 640 to enclose the open interior region 642 proximate to the second side 605 of the frame member 180. The second thermally conductive plate 660 is disposed against the battery cell 122. An area of a side of the second thermally conductive plate 660 is substantially equal to an area of a side of a body portion of the battery cell 122 adjacent to the second thermally conductive plate 660. The second thermally conductive plate 660 includes tread portions 1150, 1152, 1154, 1156, 1158, 1160, 1162, 1164 and ridge portions 1170, 1172, 1174, 1176, 1178, 1180, 1182, 1184. The tread portions 1150, 1152, 1154, 1156, 1158, 1160, 1162, 1164 of the second thermally conductive plate 660 are disposed against the tread portions 1050, 1052, 1054, 1056, 1058, 1060, 1062, 1064, respectively, of the first thermally conductive plate 650.

The ridge portions 1170, 1172, 1174, 1176, 1178, 1180, 1182, 1184 of the second thermally conductive plate 660 are disposed opposite to the ridge portions 1070, 1072, 1074, 1076, 1078, 1080, 1082, 1084, respectively, of the first thermally conductive plate 650, to form flow channels 1270, 1272, 1274, 1276, 1278, 1280, 1282, respectfully therebetween. The plurality of flow channels 1270-1282 comprise a plurality of flow channels 1190.

Referring to FIGS. 5, 6, 11, 12 and 20, the apertures 712, 714, 716, 718, 720, 722, 724 in the first peripheral wall 610 of the frame member 180 fluidly communicate with a first end of the flow channels 1270, 1272, 1274, 1276, 1278, 1280, 1282, respectively. Further, the apertures 812, 714, 816, 818, 820, 822, 824 in the second peripheral wall 620 of the frame member 180 fluidly communicate with a second end of the flow channels 1270, 1272, 1274, 1276, 1278, 1280, 1282, respectively. During operation, air flows through the apertures 712, 714, 716, 718, 720, 722, 724 and through the flow channels 1270, 1272, 1274, 1276, 1278, 1280, 1282, respectively and further through the apertures 812, 714, 816, 818, 820, 822, 824, respectively, to extract energy from battery cells 120, 122 adjacent to the first and second thermally conductive plates 650, 660, respectively.

Figure 4:
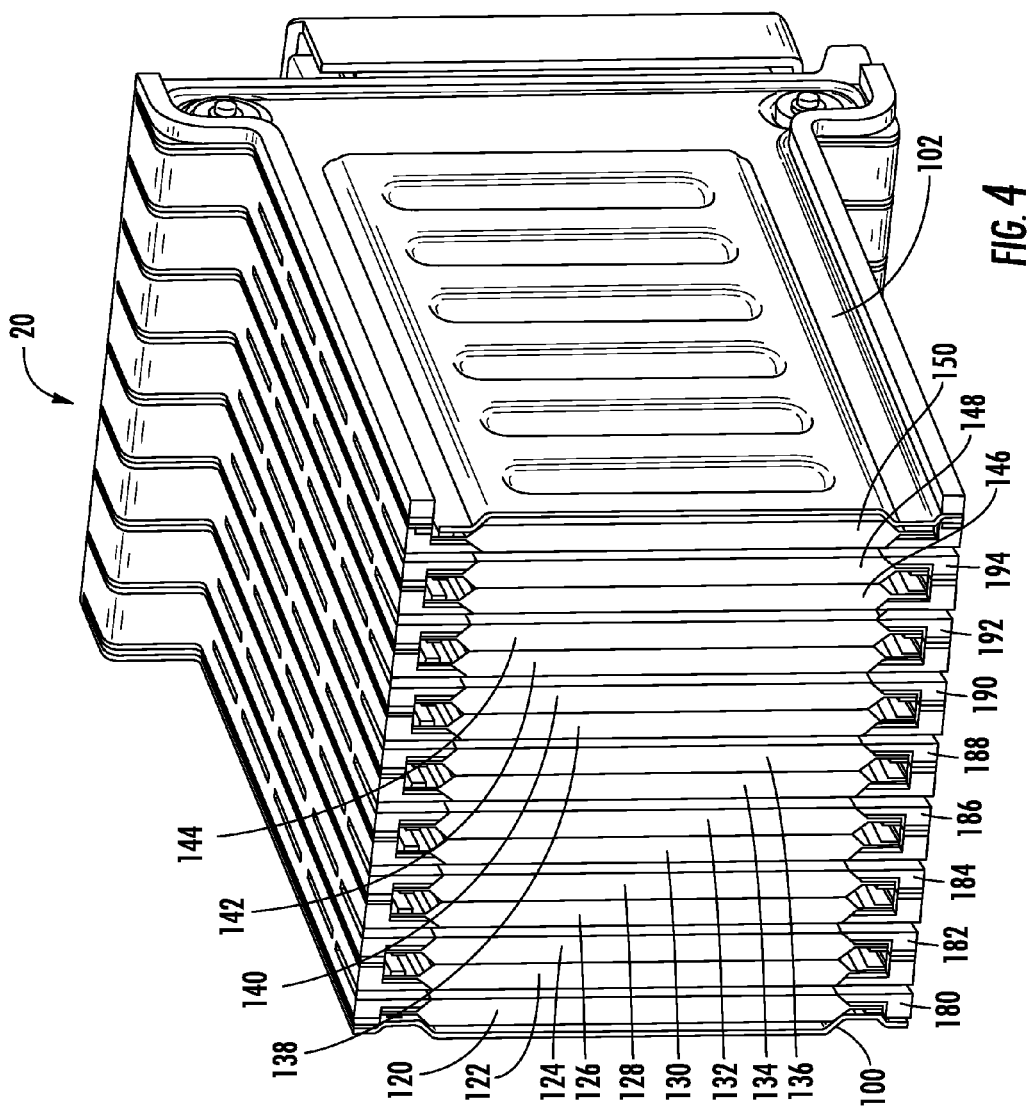
FIG. 4 is a cross-sectional schematic of the battery module of FIG. 1.
Figure 5:
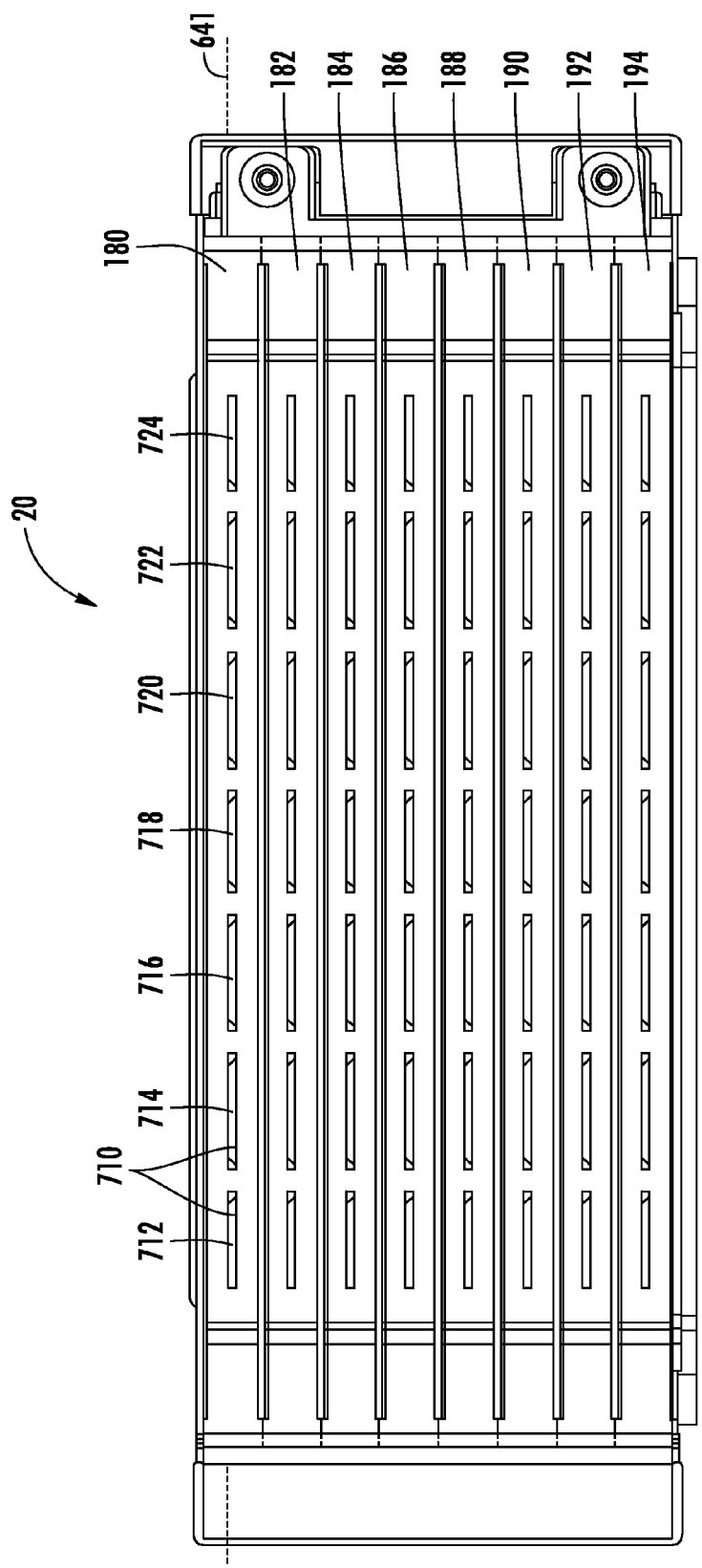
FIG. 5 is a schematic illustrating a top view of the battery module of FIG. 1.
Figure 6:
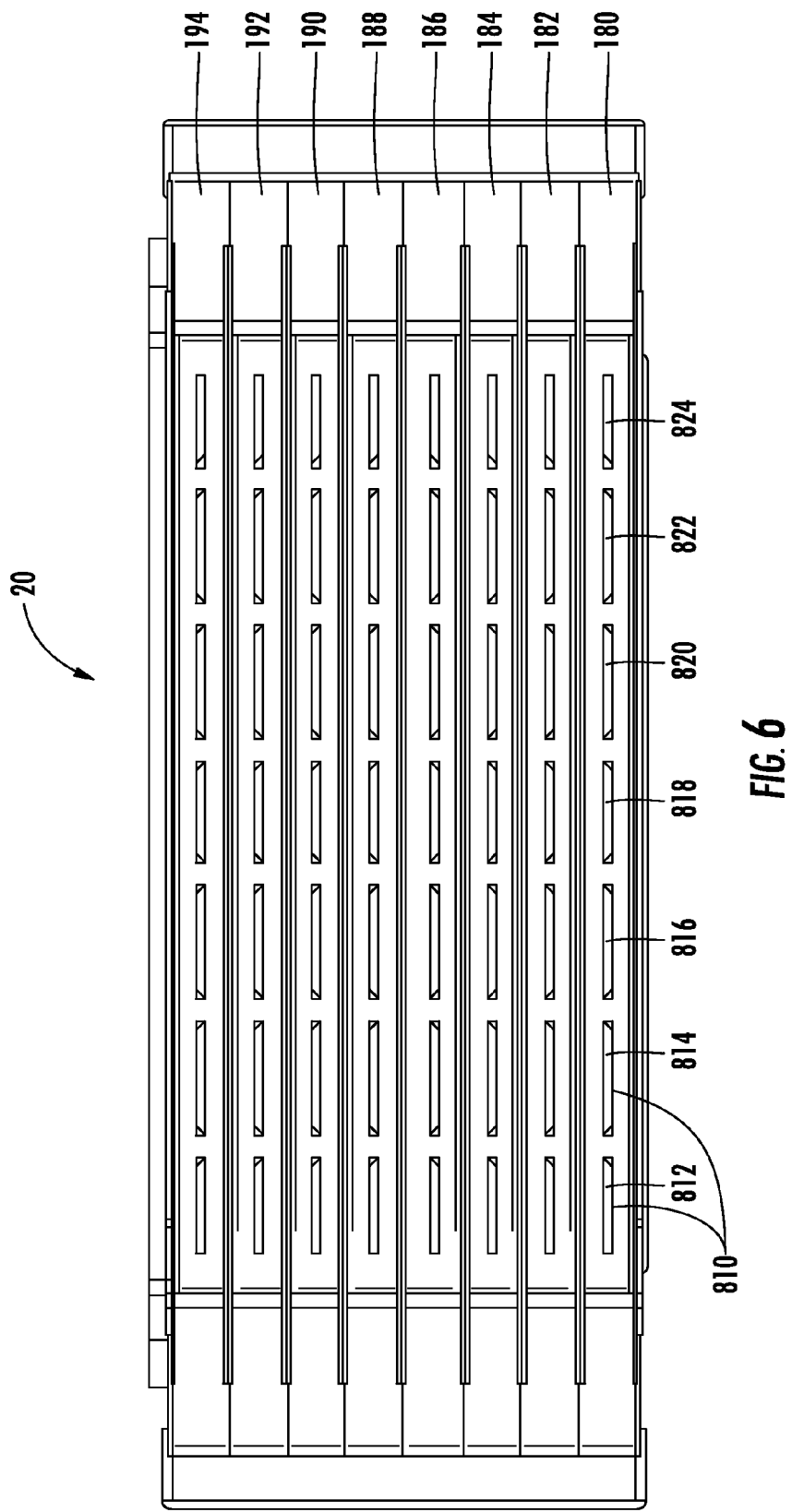
FIG. 6 is a schematic illustrating a bottom view of the battery module of FIG. 1.
Figure 14:
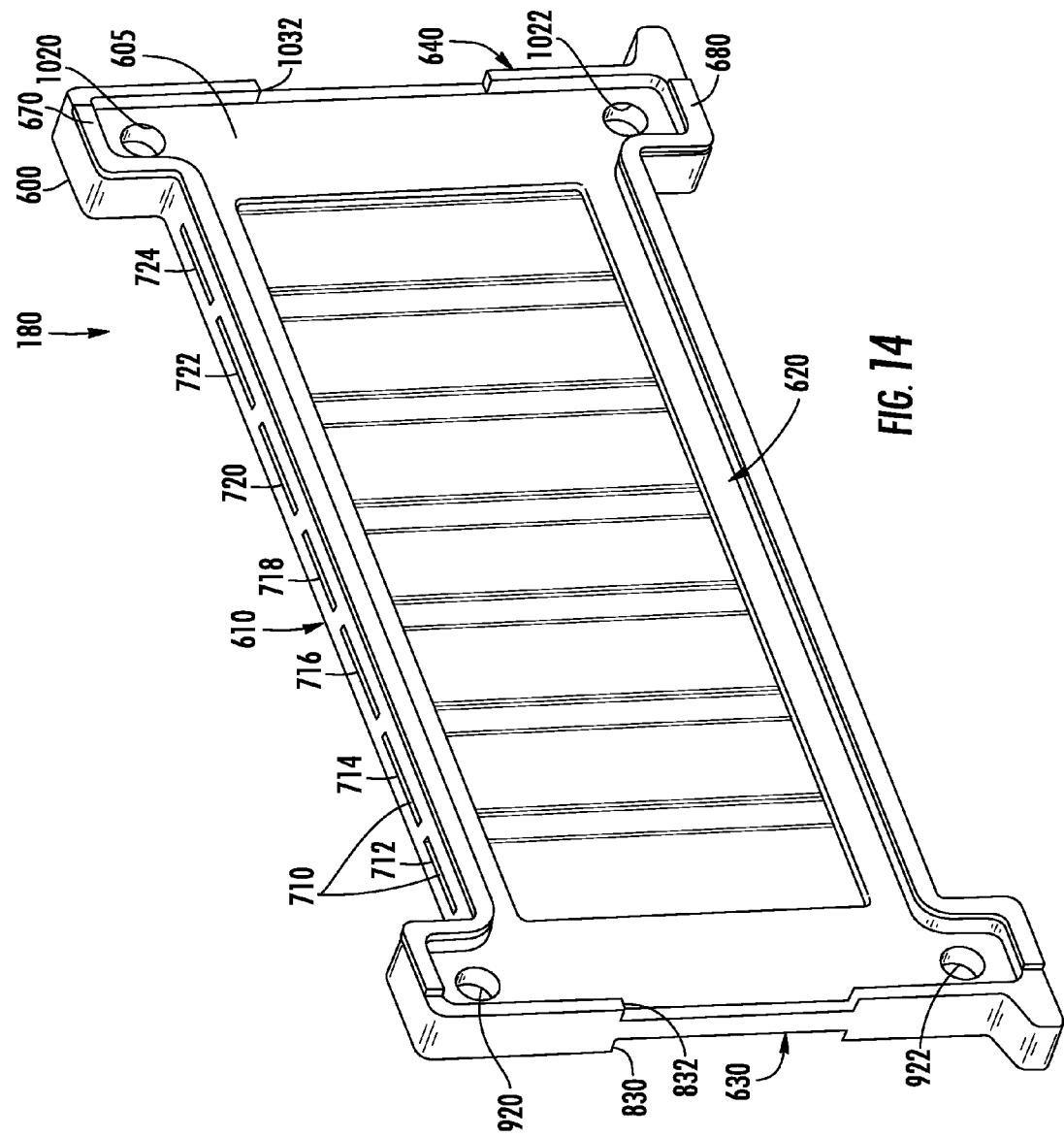
FIG. 14 is a schematic of a frame member utilized in the battery module of FIG. 1.
Figure 15:
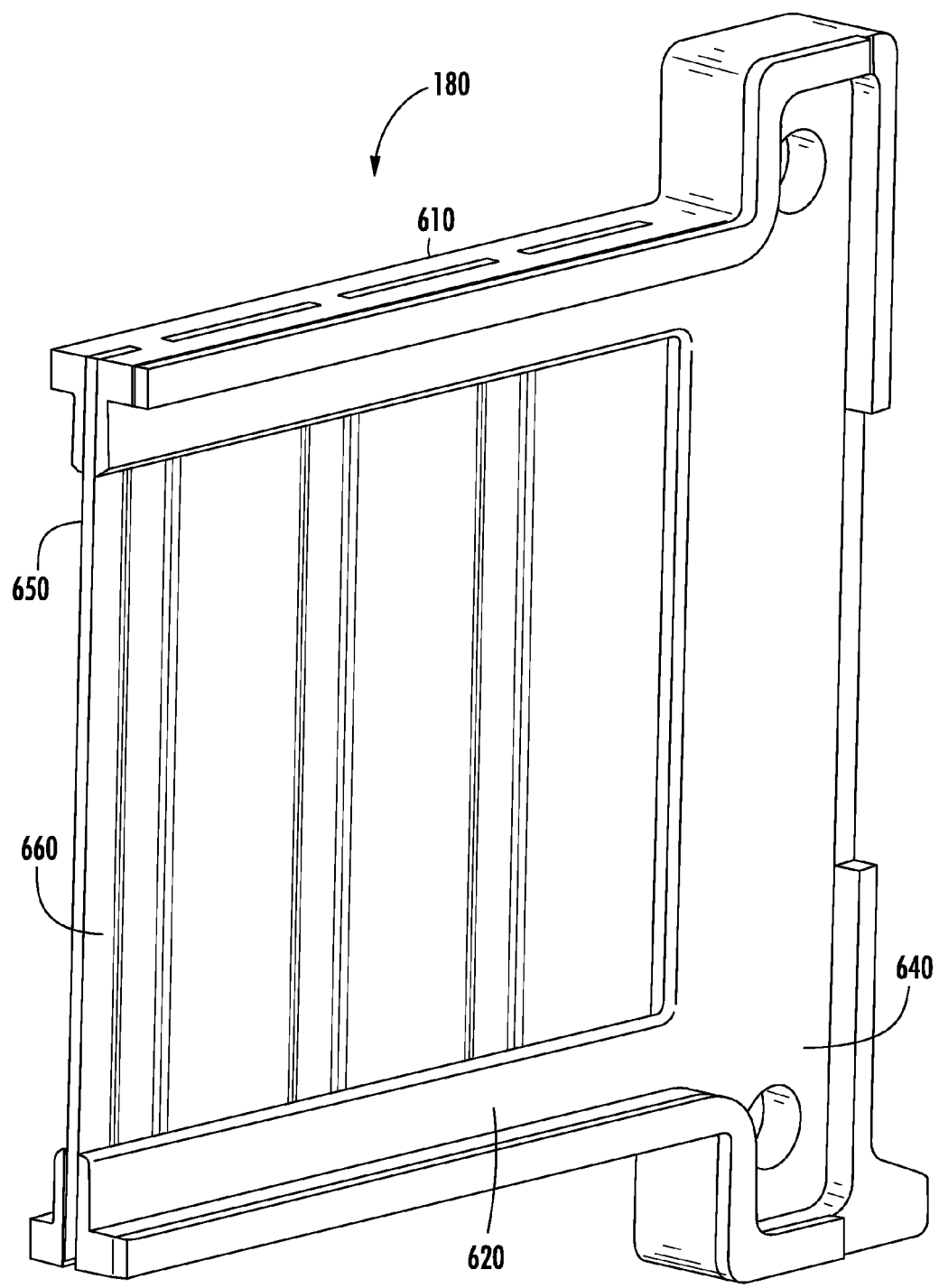
FIG. 15 is a cross-sectional schematic of the frame member of FIG. 14.
Figure 16:
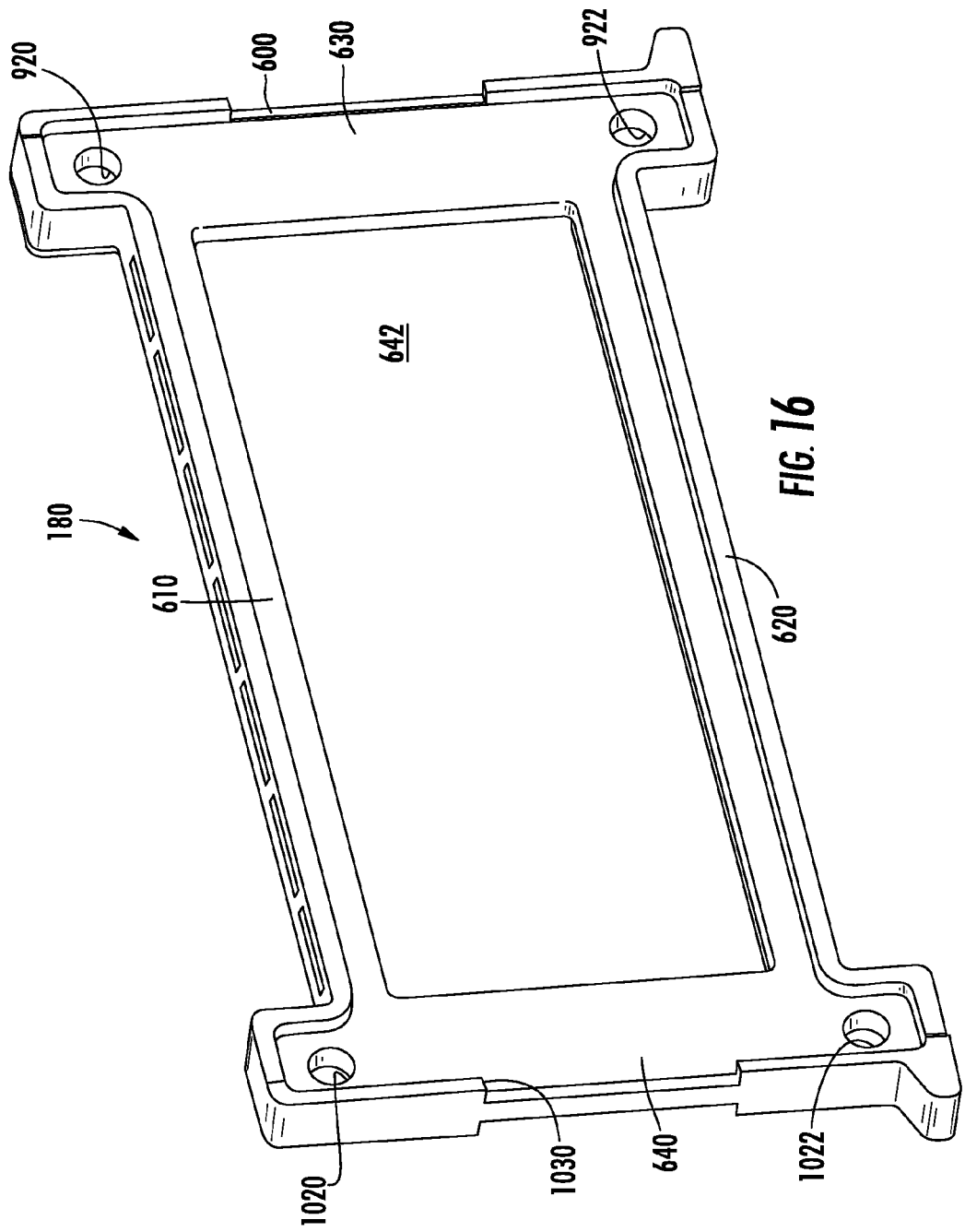
FIG. 16 is a schematic of a portion of the frame member of FIG. 14.
Figure 17:
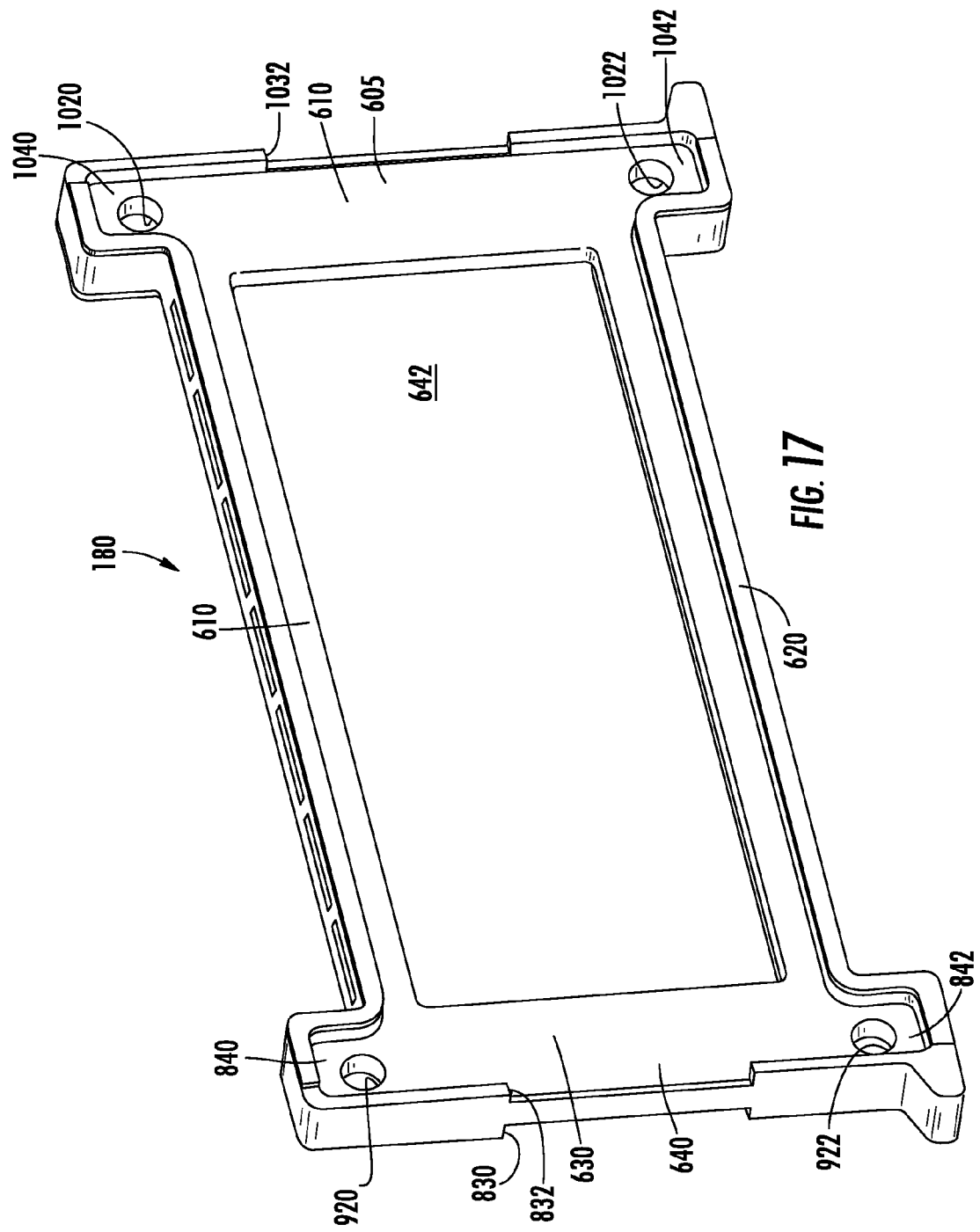
FIG. 17 is another schematic of a portion of the frame member of FIG. 14.
Figure 18:
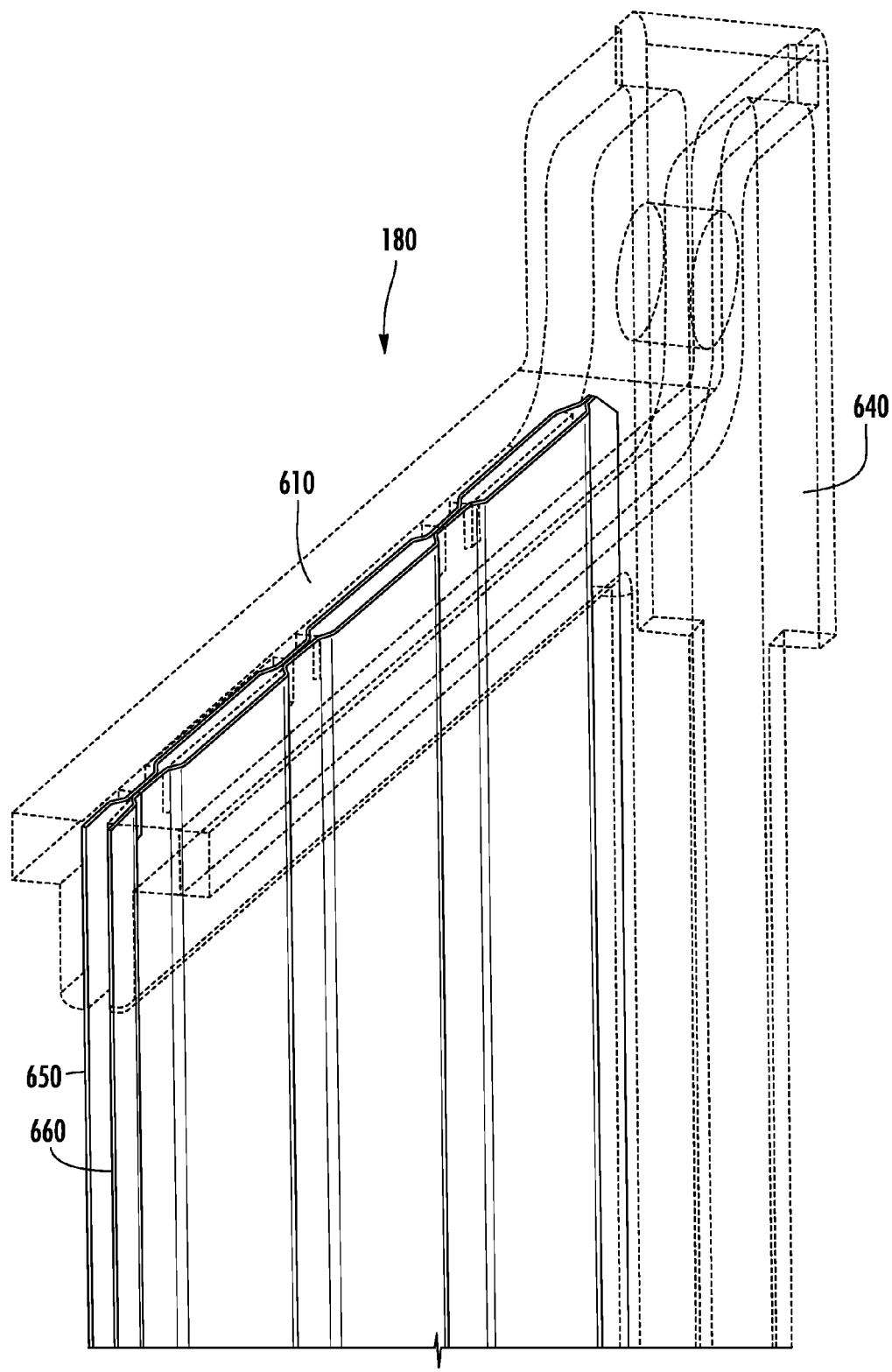
FIG. 18 is a cross-sectional schematic of a portion of the frame member of FIG. 14.
Figure 19:
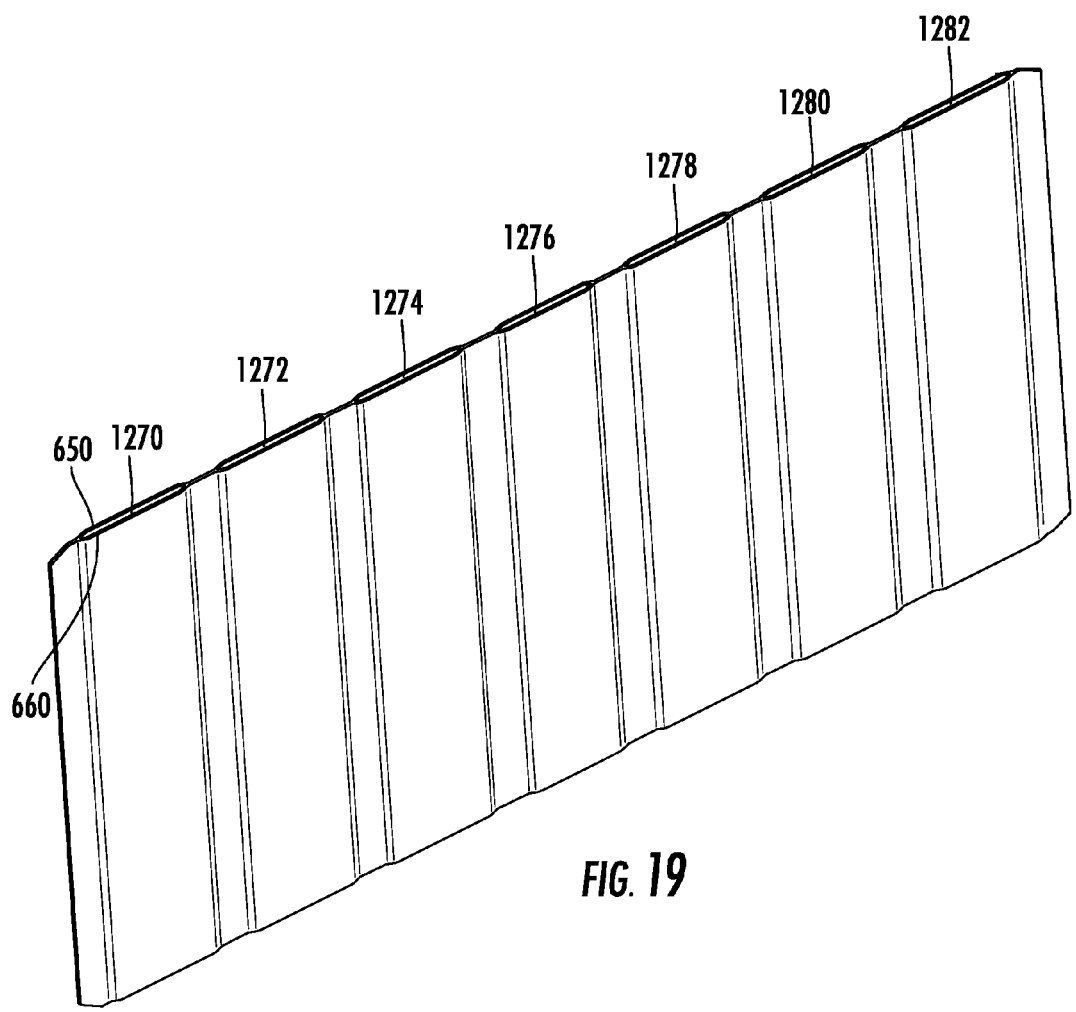
FIG. 19 is a schematic of the first and second thermally conductive plates utilized to form flow channels in the frame member of FIG. 14.
Figure 20:
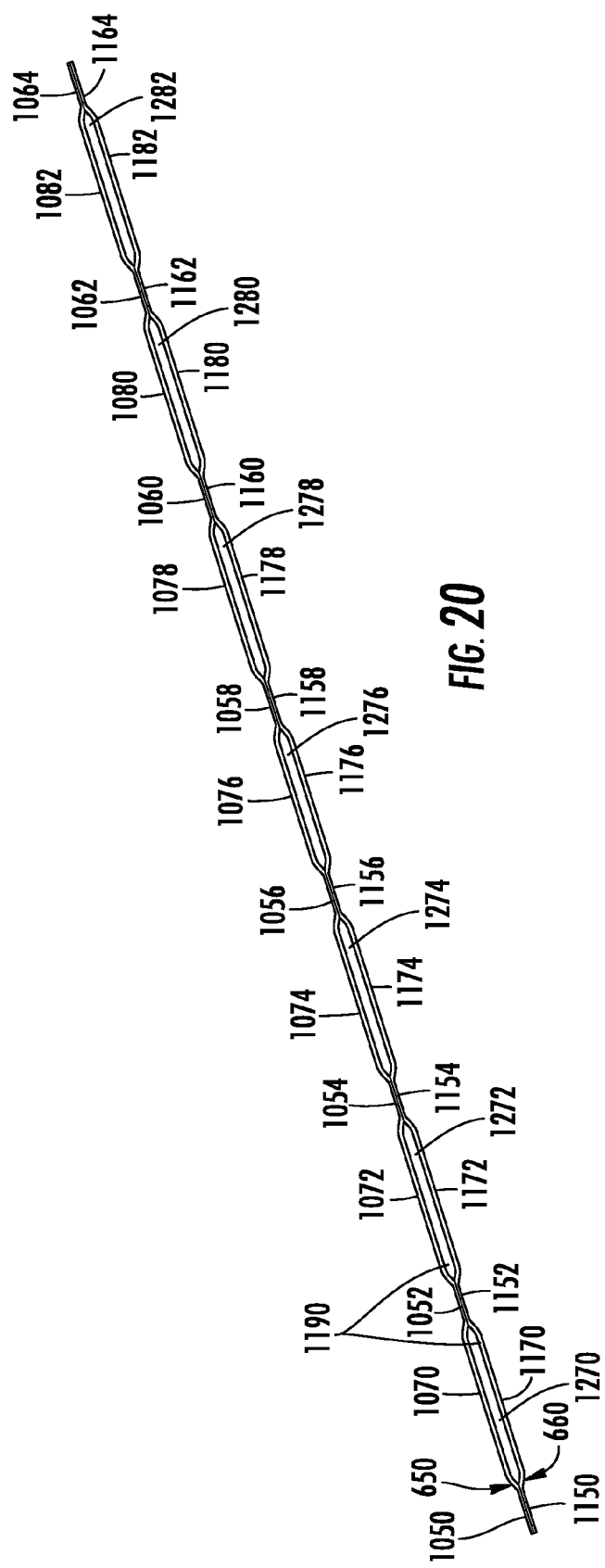
FIG. 20 is a cross-sectional schematic of the first and second thermally conductive plates of FIG. 19.
Figure 21:
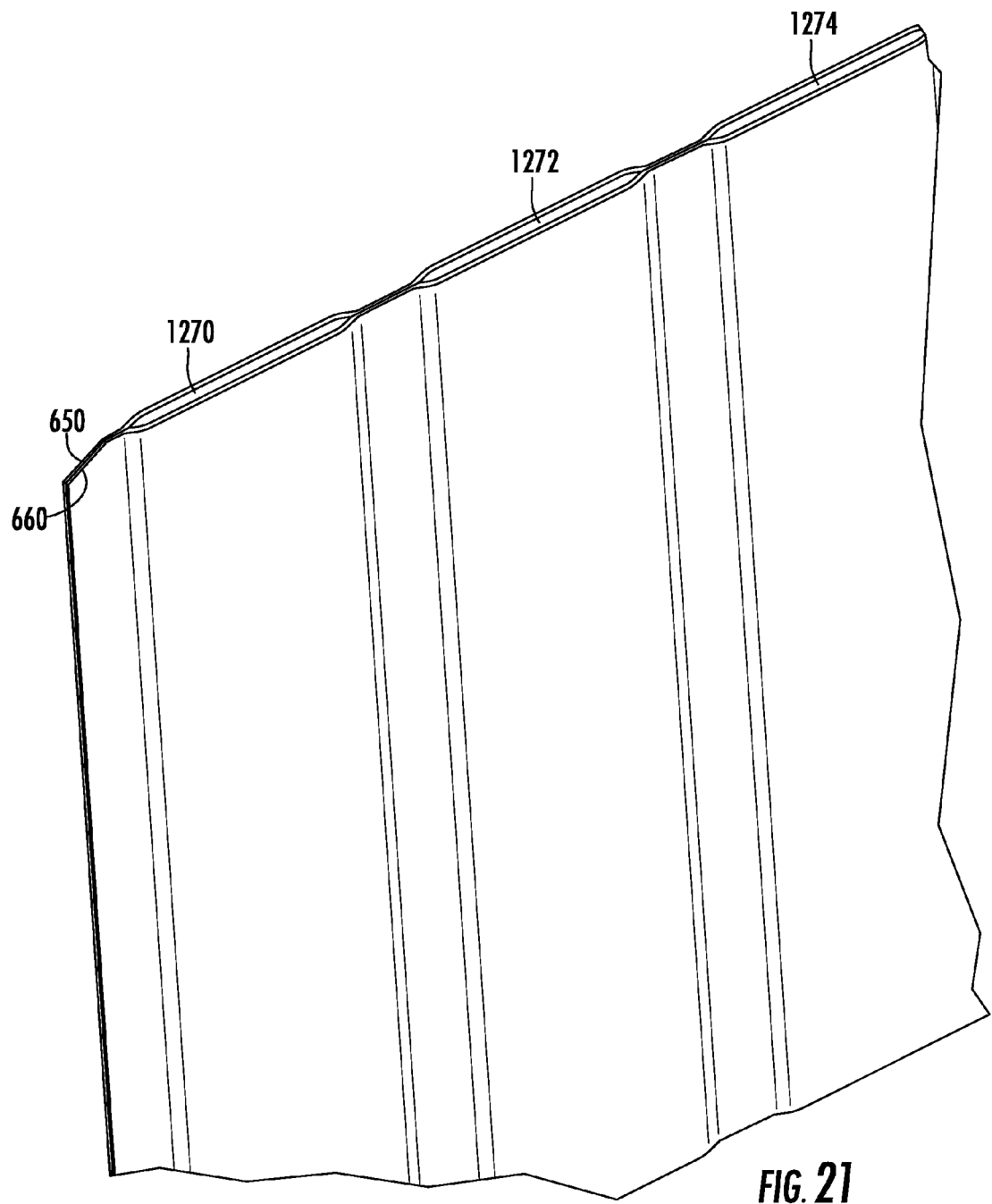
FIG. 21 is an enlarged cross-sectional schematic of a portion of the first and second thermally conductive plates of FIG. 19.
Figure 22:
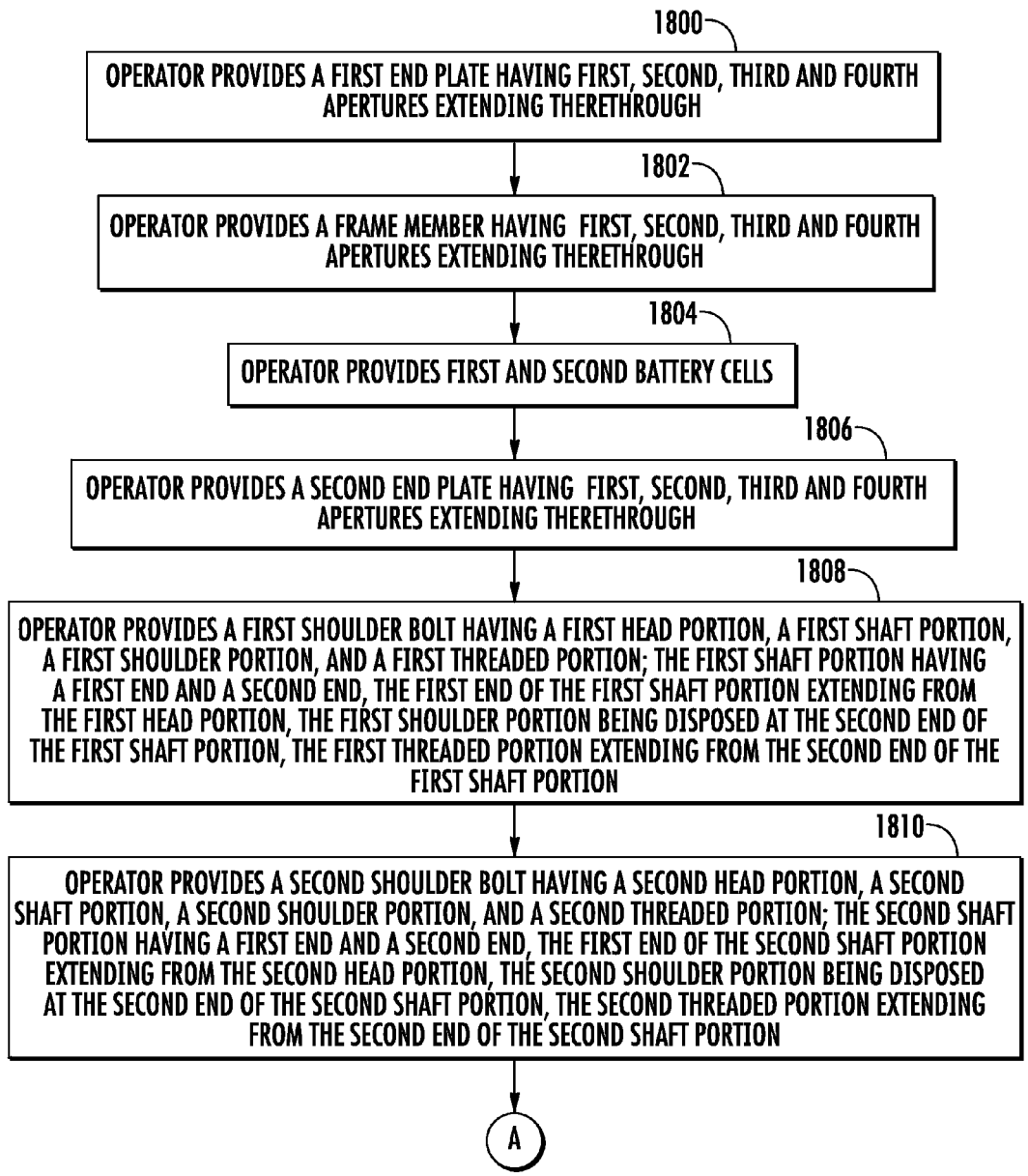
FIGS. 22-24 are flowcharts a method for assembling the battery module of FIG. 1 in accordance with another exemplary embodiment.
Figure 23:
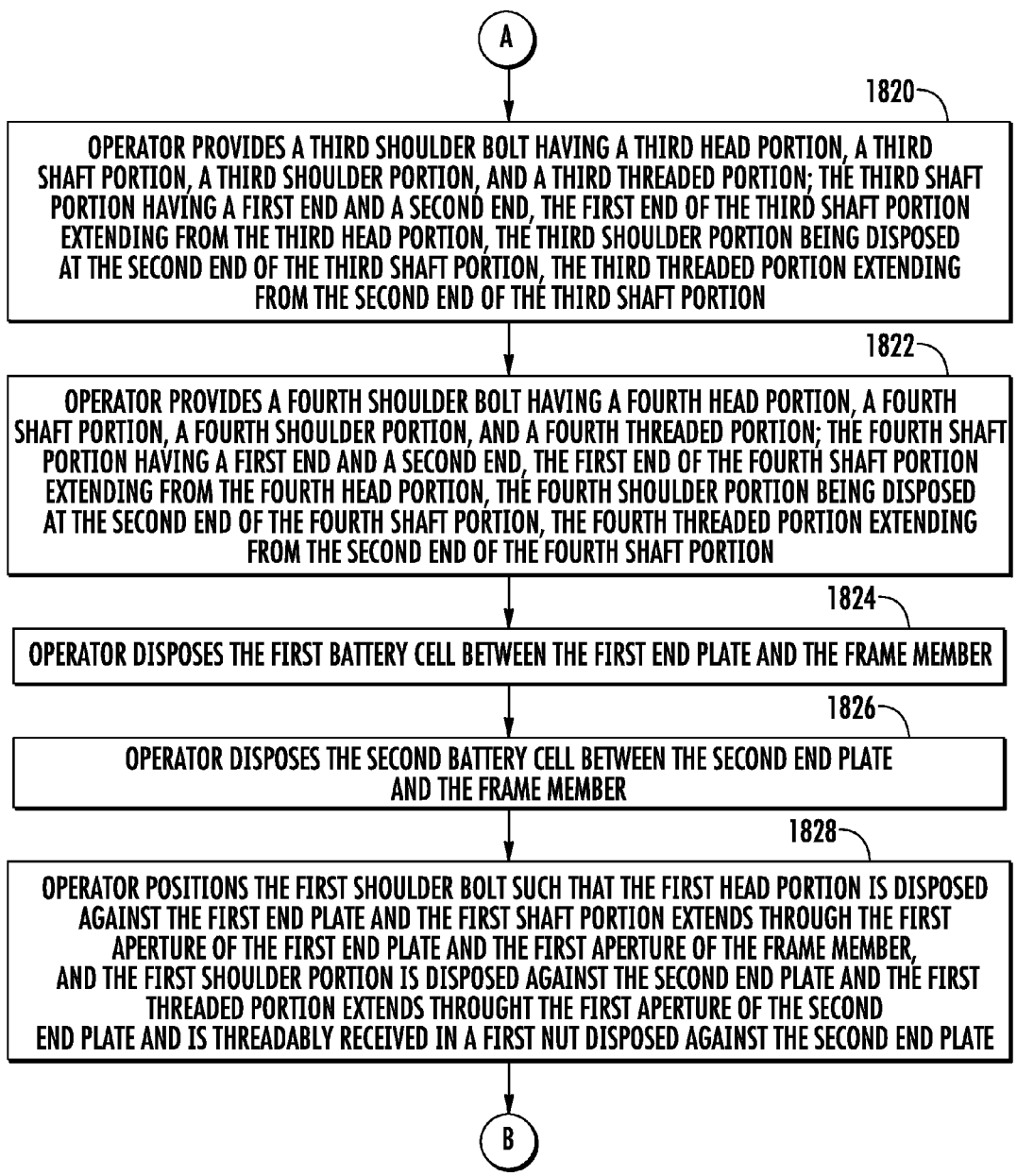
Figure 24:
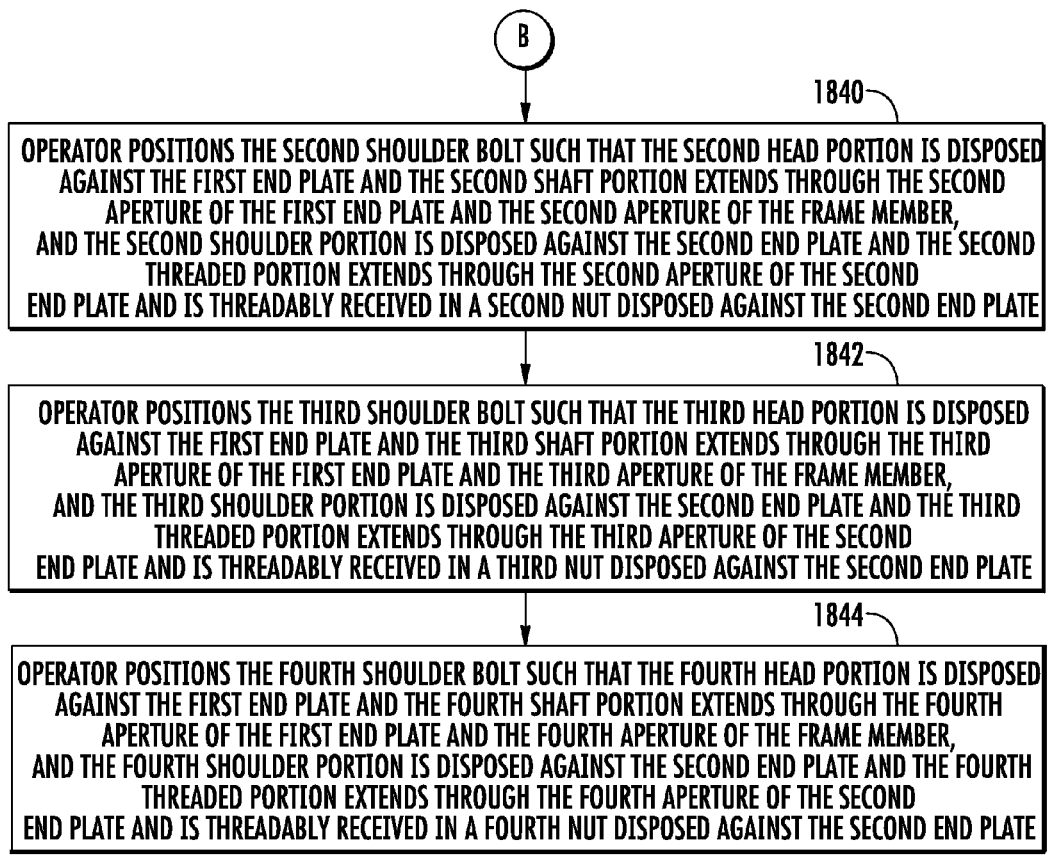
Figure 25:
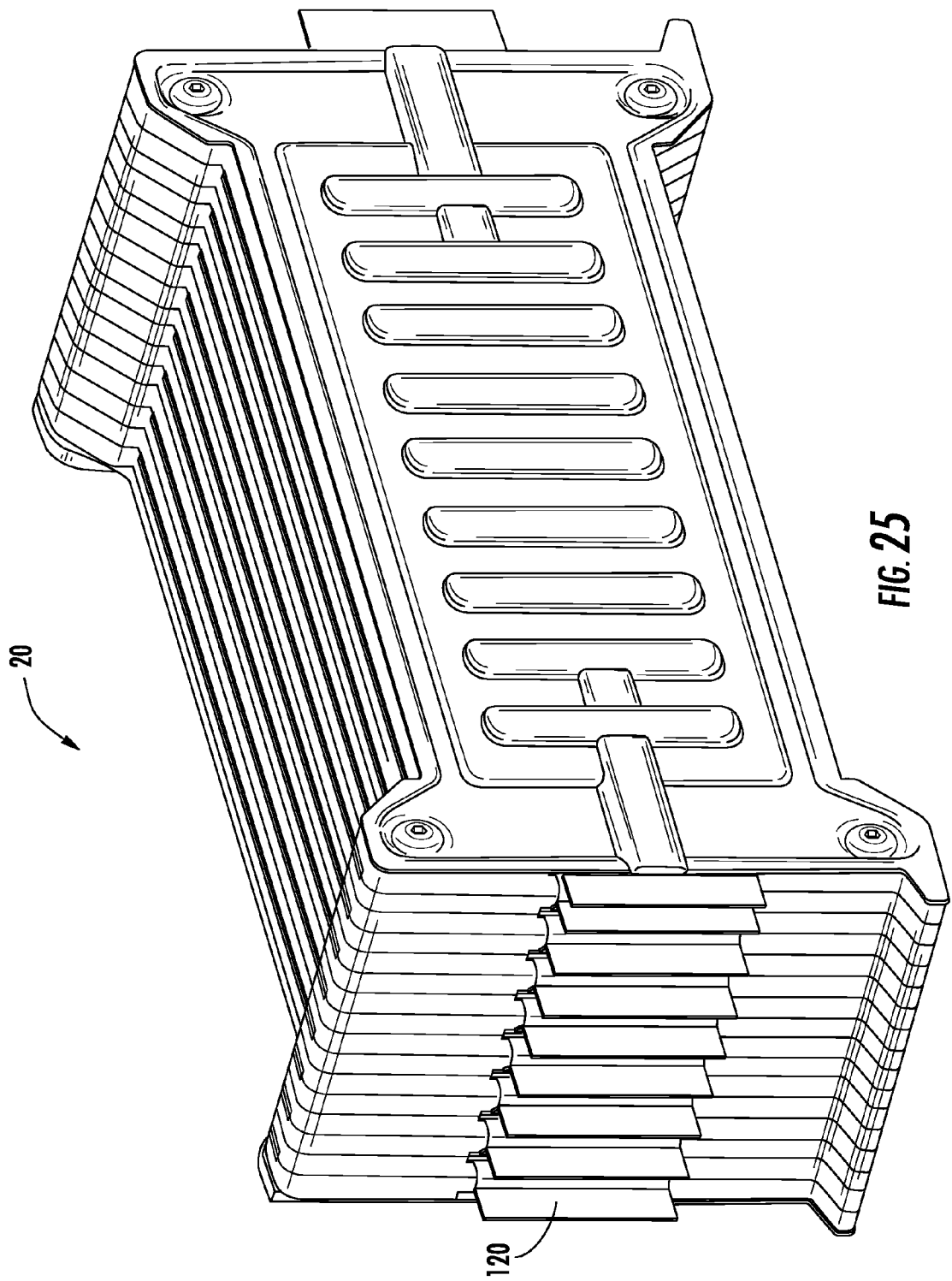
FIG. 25 is another schematic of the battery module of FIG. 1 having electrical terminals.
Figure 26:
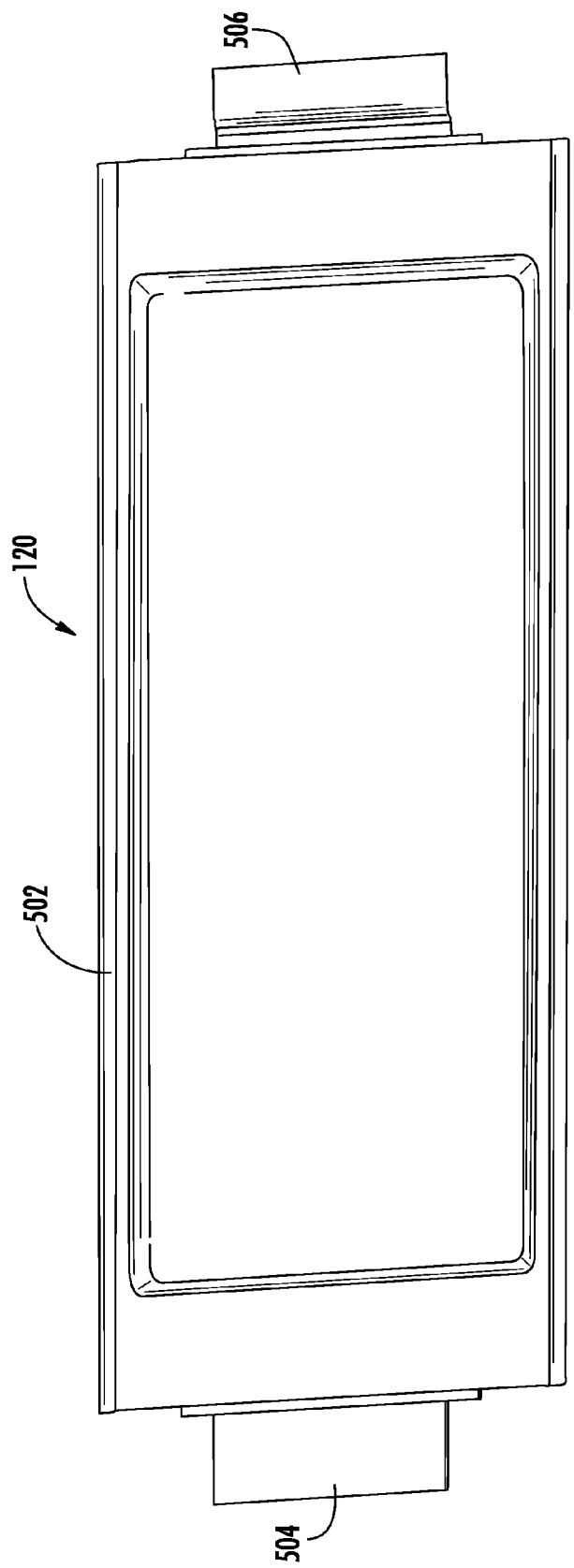
FIG. 26 is a schematic of a battery cell utilized in the battery module of FIG. 1.

Referring to FIGS. 4 and 14, the frame member 180 includes first and second elastomeric sealing members 670, 680 disposed on the first and second peripheral walls 610, 620, respectively. The first and second elastomeric sealing members 670, 680 direct any gases output by the battery cells 122, 124 to be directed toward the outlets 832, 1032 which then exit the outlets 832, 1032 to outside of the frame member 180 and the battery module 20. Thus, a flow path of any gases output by the battery cells is isolated and separate from the plurality of flow paths 1190 through the first and second thermally conductive plates 650, 660.

Figure 2:
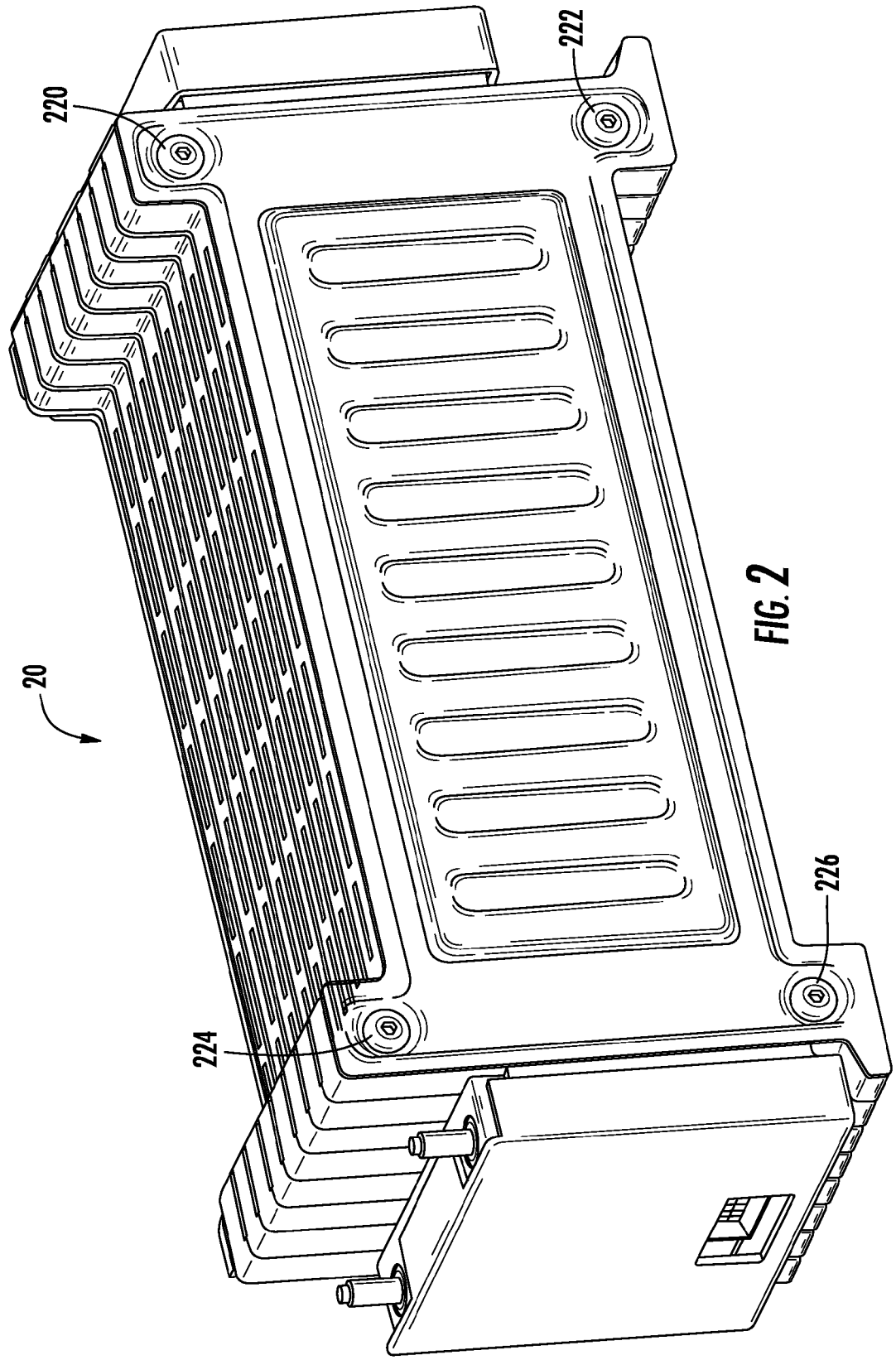
FIG. 2 is another schematic of the battery module of FIG. 1.

Referring to FIGS. 2, 7 and 9, the first, second, third, and fourth shoulder bolts 220, 222, 224, 226 are provided to couple the end plate 100, the frame members 180-194, and the end plate 102 together. Also, a length of a shaft portion of each of shoulder bolts sets a distance between the end plates 100, 102 and thus a longitudinal force applied to each of the frame members 180-194.

The first shoulder bolt 220 includes a head portion 1400, a shaft portion 1410, a shoulder portion 1420, and a threaded portion 1430. The shaft portion 1410 has a first end 1412 and a second end 1414. The first end 1412 extends from the head portion 1400. The shoulder portion 1420 is disposed at the second end 1414 of the shaft portion 1410. The threaded portion 1430 extends from the second end 1414 of the shaft portion 1410.

The first shoulder bolt 220 is disposed such that the head portion 1400 is disposed against the first end plate 100 and the shaft portion 1410 extends through the aperture 320 of the first end plate 100 and the aperture 920 of the frame member 180 and each respective adjacent aperture in the frame members 182-194, and the shoulder portion 1420 is disposed against the second end plate 102 and the threaded portion 1430 extends through the aperture 420 of the second end plate 102 and is threadably received in a nut 240 disposed against the second end plate 102.

The second shoulder bolt 222 includes a head portion 1500, a shaft portion 1510, a shoulder portion 1520, and a threaded portion 1530. The shaft portion 1510 has a first end 1512 and a second end 1514. The first end 1512 extends from the head portion 1500. The shoulder portion 1520 is disposed at the second end 1514 of the shaft portion 1510. The threaded portion 1530 extends from the second end 1514 of the shaft portion 1510.

The second shoulder bolt 222 is disposed such that the head portion 1500 is disposed against the first end plate 100 and the shaft portion 1510 extends through the aperture 322 of the first end plate 100 and the aperture 922 of the frame member 180 and each respective adjacent aperture in the frame members 182-194, and the shoulder portion 1520 is disposed against the second end plate 102 and the threaded portion 1530 extends through the aperture 422 of the second end plate 102 and is threadably received in a nut 242 disposed against the second end plate 102.

The third shoulder bolt 224 includes a head portion 1600, a shaft portion 1610, a shoulder portion 1620, and a threaded portion 1630. The shaft portion 1610 has a first end 1612 and a second end 1614. The first end 1612 extends from the head portion 1600. The shoulder portion 1620 is disposed at the second end 1614 of the shaft portion 1610. The threaded portion 1630 extends from the second end 1614 of the shaft portion 1610.

The third shoulder bolt 224 is disposed such that the head portion 1600 is disposed against the first end plate 100 and the shaft portion 1660 extends through the aperture 324 of the first end plate 100 and the aperture 1020 of the frame member 180 and each respective adjacent aperture in the frame members 182-194, and the shoulder portion 1620 is disposed against the second end plate 102 and the threaded portion 1630 extends through the aperture 424 of the second end plate 102 and is threadably received in a nut 244 disposed against the second end plate 102.

The fourth shoulder bolt 226 includes a head portion 1700, a shaft portion 1710, a shoulder portion 1720, and a threaded portion 1730. The shaft portion 1710 has a first end 1712 and a second end 1714. The first end 1712 extends from the head portion 1700. The shoulder portion 1720 is disposed at the second end 1714 of the shaft portion 1710. The threaded portion 1730 extends from the second end 1714 of the shaft portion 1710.

The fourth shoulder bolt 226 is disposed such that the head portion 1700 is disposed against the first end plate 100 and the shaft portion 1760 extends through the aperture 326 of the first end plate 100 and the aperture 1022 of the frame member 180 and each respective adjacent aperture in the frame members 182-194, and the shoulder portion 1720 is disposed against the second end plate 102 and the threaded portion 1730 extends through the aperture 426 of the second end plate 102 and is threadably received in a nut 246 disposed against the second end plate 102.

Figure 3:
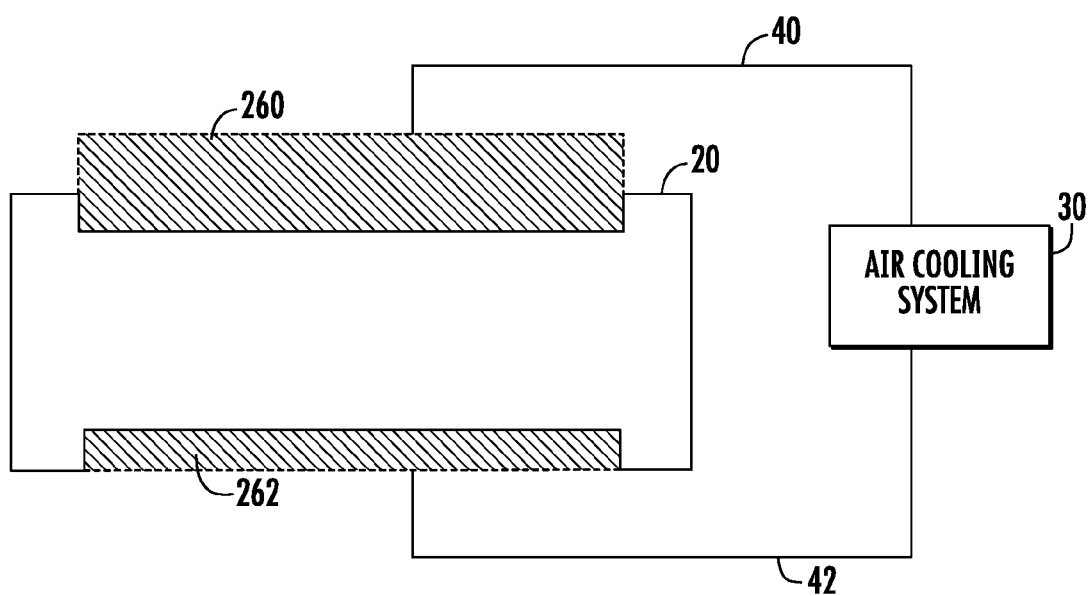
FIG. 3 is a block diagram of a battery system utilizing the battery module of FIG. 1.

Referring to FIGS. 3 and 4, the manifold 260 is configured to route air from the conduit 40 into the apertures in the first peripheral walls (e.g., upper walls) of the frame members 180-194 which flows through the plurality of flow channels 1190 to the apertures in the second peripheral walls (e.g., lower walls) of the frame members 180-194. The manifold 262 is configured to receive the air from the apertures in the second peripheral walls of the frame members 180-194 and to route the air into the conduit 42. The conduit 42 routes the air to the air cooling system 30.

Referring to FIGS. 7, 9 and 22-24, a flowchart of a method for assembling the battery module 20 in accordance with another exemplary embodiment is provided. For purposes of simplicity, the method will only describe the assembly process utilizing first and second battery cells and a single frame member. Of course, it should be understood that the method can be implemented utilizing a plurality of additional frame members and a plurality of additional battery cells.

At step 1800, an operator provides the end plate 100 having the apertures 320, 322, 324, 326 extending therethrough.

At step 1802, the operator provides the frame member 180 having the apertures 920, 922, 1020, 1022 extending therethrough.

At step 1804, the operator provides the battery cells 120, 122.

At step 1806, the operator provides the end plate 102 having the apertures 420, 422, 424, 426 extending therethrough.

At step 1808, the operator provides the first shoulder bolt 220 having the head portion 1400, the shaft portion 1410, the shoulder portion 1420, and the threaded portion 1430. The shaft portion 1410 has the first end 1412 and the second end 1414. The first end 1412 of the shaft portion 1410 extends from the head portion 1400. The shoulder portion 1420 is disposed at the second end 1414 of the shaft portion 1410. The threaded portion 1430 extends from the second end of the shaft portion 1410.

At step 1810, the operator provides the second shoulder bolt 222 having the head portion 1500, the shaft portion 1510, the shoulder portion 1520, and the threaded portion 1530. The shaft portion 1510 has the first end 1512 and the second end 1514. The first end of the shaft portion 1510 extends from the head portion 1500. The shoulder portion 1520 is disposed at the second end 1514 of the shaft portion 1510. The threaded portion 1530 extends from the second end 1514 of the shaft portion 1510.

At step 1820, the operator provides the shoulder bolt 224 having the head portion 1600, the shaft portion 1610, the shoulder portion 1620, and the threaded portion 1630. The shaft portion 1610 has the first end 1612 and the second end 1614. The first end 1612 of the shaft portion 1610 extends from the head portion 1600. The shoulder portion 1620 is disposed at the second end 1614 of the shaft portion 1610. The threaded portion 1630 extends from the second end 1614 of the shaft portion 1610.

At step 1822, the operator provides the fourth shoulder bolt 226 having the head portion 1700, the shaft portion 1710, the shoulder portion 1720, and the threaded portion 1730. The shaft portion 1710 has the first end 1712 and the second end 1714. The first end 1712 of the shaft portion 1710 extends from the head portion 1700. The shoulder portion 1720 is disposed at the second end 1714 of the shaft portion 1710. The threaded portion 1730 extends from the second end 1714 of the shaft portion 1710.

At step 1824, the operator disposes the battery cell 120 between the end plate 100 and the frame member 180.

At step 1826, the operator disposes the battery cell 122 between the end plate 102 and the frame member 180.

At step 1828, the operator positions the first shoulder bolt 220 such that the head portion 1400 is disposed against the end plate 100 and the shaft portion 1410 extends through the aperture 320 of the end plate 100 and the aperture 920 of the frame member 180, and the shoulder portion 1420 is disposed against the end plate 102 and the threaded portion 1430 extends through the aperture 420 of the end plate 102 and is threadably received in the nut 240 disposed against the end plate 102.

At step 1840, the operator positions the second shoulder bolt 222 such that the head portion 1500 is disposed against the end plate 100 and the shaft portion 1510 extends through the aperture 322 of the end plate 100 and the aperture 922 of the frame member 180, and the shoulder portion 1520 is disposed against the end plate 102 and the threaded portion 1530 extends through the aperture 422 of the end plate 102 and is threadably received in the nut 242 disposed against the end plate 102.

At step 1842, the operator positions the third shoulder bolt 224 such that the head portion 1600 is disposed against the end plate 100 and the shaft portion 1610 extends through the aperture 324 of the end plate 100 and the aperture 1020 of the frame member 180, and the shoulder portion 1620 is disposed against the end plate 102 and the threaded portion 1630 extends through the aperture 424 of the end plate 102 and is threadably received in the nut 244 disposed against the end plate 102.

At step 1844, the operator positions the fourth shoulder bolt 226 such that the head portion 1700 is disposed against the end plate 100 and the shaft portion 1710 extends through the aperture 326 of the end plate 100 and the aperture 1022 of the frame member 180, and the shoulder portion 1720 is disposed against the end plate 102 and the threaded portion 1730 extends through the aperture 426 of the end plate 102 and is threadably received in the nut 246 disposed against the end plate 102.

The battery module 20 and the method for assembling the battery module 20 provide a substantial advantage over other battery modules and methods. In particular, the battery module 20 and method utilize shoulder bolts to couple end plates and frame members together such that the lengths of the shaft portions of the shoulder bolts set a distance between the end plates and thus a longitudinal force applied to each of the frame members disposed between the end plates.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery module, comprising:
a first end plate having first, second, third and fourth apertures extending therethrough;
a frame member having first, second, third, and fourth apertures extending therethrough;
a first battery cell disposed between the first end plate and the frame member;
a second end plate having first, second, third and fourth apertures extending therethrough, the second end plate further having a first side and a second side disposed opposite to the first side;
a second battery cell disposed between the second end plate and the frame member;
a first shoulder bolt having a first head portion, a first shaft portion, a first shoulder portion, and a first threaded portion; the first shaft portion having a first end and a second end, the first end of the first shaft portion extending from the first head portion, the first shoulder portion being disposed at the second end of the first shaft portion, the first threaded portion extending from the second end of the first shaft portion; and
the first shoulder bolt being disposed such that the first head portion is disposed against the first end plate and the first shaft portion extends through the first aperture of the first end plate and the first aperture of the frame member, and the first shoulder portion being disposed directly against and contacting the first side of the second end plate and the first threaded portion extending through the first aperture of the second end plate and being threadably received in a first nut, and the first nut being disposed directly against and contacting the second side of the second end plate.

2. The battery module of claim 1, further comprising:
a second shoulder bolt having a second head portion, a second shaft portion, a second shoulder portion, and a second threaded portion; the second shaft portion having a first end and a second end, the first end of the second shaft portion extending from the second head portion, the second shoulder portion being disposed at the second end of the second shaft portion, the second threaded portion extending from the second end of the second shaft portion; and
the second shoulder bolt being disposed such that the second head portion is disposed against the first end plate and the second shaft portion extends through the second aperture of the first end plate and the second aperture of the frame member, and the second shoulder portion is disposed against the second end plate and the second threaded portion extends through the second aperture of the second end plate and is threadably received in a second nut disposed against the second end plate.

3. The battery module of claim 2, further comprising:
a third shoulder bolt having a third head portion, a third shaft portion, a third shoulder portion, and a third threaded portion; the third shaft portion having a first end and a second end, the first end of the third shaft portion extending from the third head portion, the third shoulder portion being disposed at the second end of the third shaft portion, the third threaded portion extending from the second end of the third shaft portion; and
the third shoulder bolt being disposed such that the third head portion is disposed against the first end plate and the third shaft portion extends through the third aperture of the first end plate and the third aperture of the frame member, and the third shoulder portion is disposed against the second end plate and the third threaded portion extends through the third aperture of the second end plate and is threadably received in a third nut disposed against the second end plate.

4. The battery module of claim 3, further comprising:
a fourth shoulder bolt having a fourth head portion, a fourth shaft portion, a fourth shoulder portion, and a fourth threaded portion; the fourth shaft portion having a first end and a second end, the first end of the fourth shaft portion extending from the fourth head portion, the fourth shoulder portion being disposed at the second end of the fourth shaft portion, the fourth threaded portion extending from the second end of the fourth shaft portion; and
the fourth shoulder bolt being disposed such that the fourth head portion is disposed against the first end plate and the fourth shaft portion extends through the fourth aperture of the first end plate and the fourth aperture of the frame member, and the fourth shoulder portion is disposed against the second end plate and the fourth threaded portion extends through the fourth aperture of the second end plate and is threadably received in a fourth nut disposed against the second end plate.

5. The battery module of claim 1, wherein the first and second end plates are constructed of steel.

6. The battery module of claim 5, wherein the frame member is constructed at least partially of plastic.

7. The battery module of claim 1, wherein the first end plate has first, second, third, and fourth peripheral corner regions, the first, second, third, and fourth apertures of the first end plate extending through the first, second, third, and fourth peripheral corner regions, respectively, of the first end plate.

8. The battery module of claim 7, wherein the frame member has first, second, third, and fourth peripheral corner regions, the first, second, third, and fourth apertures of the frame member extending through the first, second, third, and fourth peripheral corner regions, respectively, of the frame member.

9. The battery module of claim 7, wherein a distance between the first and second end plates is equal to a longitudinal distance from the first head portion to the first shoulder portion.

10. A method of assembling a battery module, comprising:
providing a first end plate having first, second, third and fourth apertures extending therethrough;
providing a frame member having first, second, third, and fourth apertures extending therethrough;
providing first and second battery cells;
providing a second end plate having first, second, third and fourth apertures extending therethrough, the second end plate further having a first side and a second side disposed opposite to the first side;

providing a first shoulder bolt having a first head portion, a first shaft portion, a first shoulder portion, and a first threaded portion; the first shaft portion having a first end and a second end, the first end of the first shaft portion extending from the first head portion, the first shoulder portion being disposed at the second end of the first shaft portion, the first threaded portion extending from the second end of the first shaft portion;

disposing the first battery cell between the first end plate and the frame member;

disposing the second battery cell between the second end plate and the frame member; and positioning the first shoulder bolt such that the first head portion is disposed against the first end plate and the first shaft portion extends through the first aperture of the first end plate and the first aperture of the frame member, and the first shoulder portion is disposed directly against and contacts the first side of the second end plate and the first threaded portion extends through the first aperture of the second end plate and is threadably received in a first nut, and the first nut is disposed directly against and contacts the second side of the second end plate.

11. The method of claim 10, further comprising:

providing a second shoulder bolt having a second head portion, a second shaft portion, a second shoulder portion, and a second threaded portion; the second shaft portion having a first end and a second end, the first end of the second shaft portion extending from the second head portion, the second shoulder portion being disposed at the second end of the second shaft portion, the second threaded portion extending from the second end of the second shaft portion; and positioning the second shoulder bolt such that the second head portion is disposed against the first end plate and the second shaft portion extends through the second aperture of the first end plate and the second aperture of the frame member, and the second shoulder portion is disposed against the second end plate and the second threaded portion extends through the second aperture of the second end plate and is threadably received in a second nut disposed against the second end plate.

12. The method of claim 11, further comprising:

providing a third shoulder bolt having a third head portion, a third shaft portion, a third shoulder portion, and a third threaded portion; the third shaft portion having a first end and a second end, the first end of the third shaft portion extending from the third head portion, the third shoulder portion being disposed at the second end of the third shaft portion, the third threaded portion extending from the second end of the third shaft portion; and positioning the third shoulder bolt such that the third head portion is disposed against the first end plate and the third shaft portion extends through the third aperture of the first end plate and the third aperture of the frame member, and the third shoulder portion is disposed against the second end plate and the third threaded portion extends through the third aperture of the second end plate and is threadably received in a third nut disposed against the second end plate.

13. The method of claim 12, further comprising:

providing a fourth shoulder bolt having a fourth head portion, a fourth shaft portion, a fourth shoulder portion, and a fourth threaded portion; the fourth shaft portion having a first end and a second end, the first end of the fourth shaft portion extending from the fourth head portion, the fourth shoulder portion being disposed at the second end of the fourth shaft portion, the fourth threaded portion extending from the second end of the fourth shaft portion; and positioning the fourth shoulder bolt such that the fourth head portion is disposed against the first end plate and the fourth shaft portion extends through the fourth aperture of the first end plate and the fourth aperture of the frame member, and the fourth shoulder portion is disposed against the second end plate and the fourth threaded portion extends through the fourth aperture of the second end plate and is threadably received in a fourth nut disposed against the second end plate.

14. A battery module, comprising:

a first metal end plate having first, second, third and fourth apertures extending therethrough;

a plastic frame member having first, second, third, and fourth apertures extending therethrough;

a first battery cell disposed between the first metal end plate and the plastic frame member;

a second metal end plate having first, second, third and fourth apertures extending therethrough, the second metal end plate further having a first side and a second side disposed opposite to the first side;

a second battery cell disposed between the second metal end plate and the plastic frame member;

a first shoulder bolt having a first head portion, a first shaft portion, a first shoulder portion, and a first threaded portion; the first shaft portion having a first end and a second end, the first end of the first shaft portion extending from the first head portion, the first shoulder portion being disposed at the second end of the first shaft portion, the first threaded portion extending from the second end of the first shaft portion; and the first shoulder bolt being disposed such that the first head portion is disposed against the first metal end plate and the first shaft portion extends through the first aperture of the first metal end plate and the first aperture of the plastic frame member, and the first shoulder portion being disposed directly against and contacting the first side of the second metal end plate, and the first threaded portion extending through the first aperture of the second metal end plate and being threadably received in a first nut.

15. The battery module of claim 14, wherein the first nut being disposed directly against and contacting the second side of the second metal end plate.

* * * * *